Oct. 13, 1959    J. G. LORD ET AL    2,908,010
INSERTION MACHINE
Filed Jan. 16, 1956    10 Sheets-Sheet 1

INVENTORS
JOHN G. LORD
CHARLES W. WOODS
BY
Carl H. Synnestvedt
AGENT

INVENTORS
JOHN G. LORD
CHARLES W. WOODS
BY
Carl H. Lynnestvedt
AGENT

Oct. 13, 1959 J. G. LORD ET AL 2,908,010
INSERTION MACHINE
Filed Jan. 16, 1956 10 Sheets-Sheet 7

INVENTORS
JOHN G. LORD
CHARLES W. WOODS
BY
AGENT

Oct. 13, 1959   J. G. LORD ET AL   2,908,010
INSERTION MACHINE
Filed Jan. 16, 1956   10 Sheets-Sheet 8

INVENTORS
JOHN G. LORD
CHARLES W. WOODS
BY
Carl H. Synnestvedt
AGENT

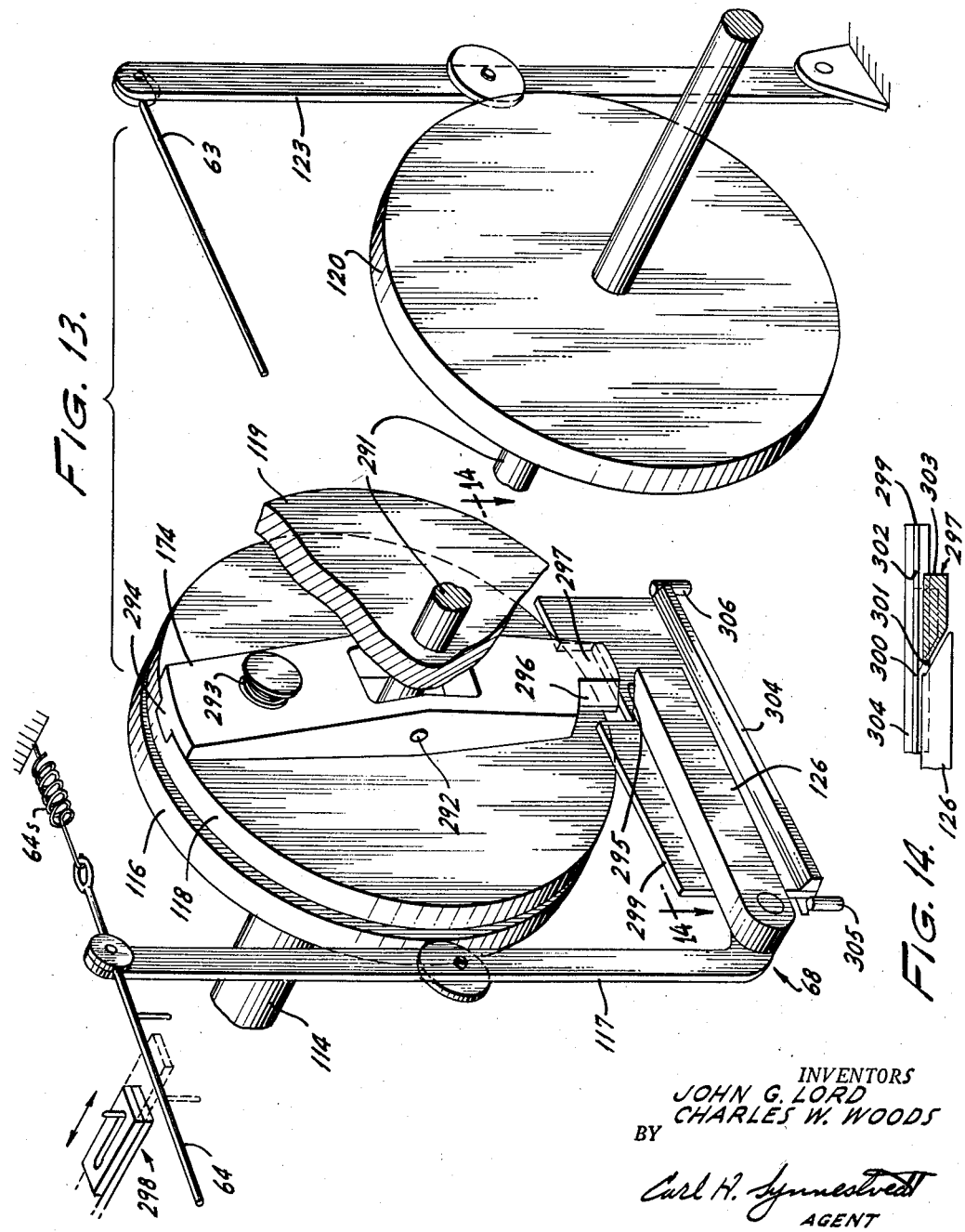

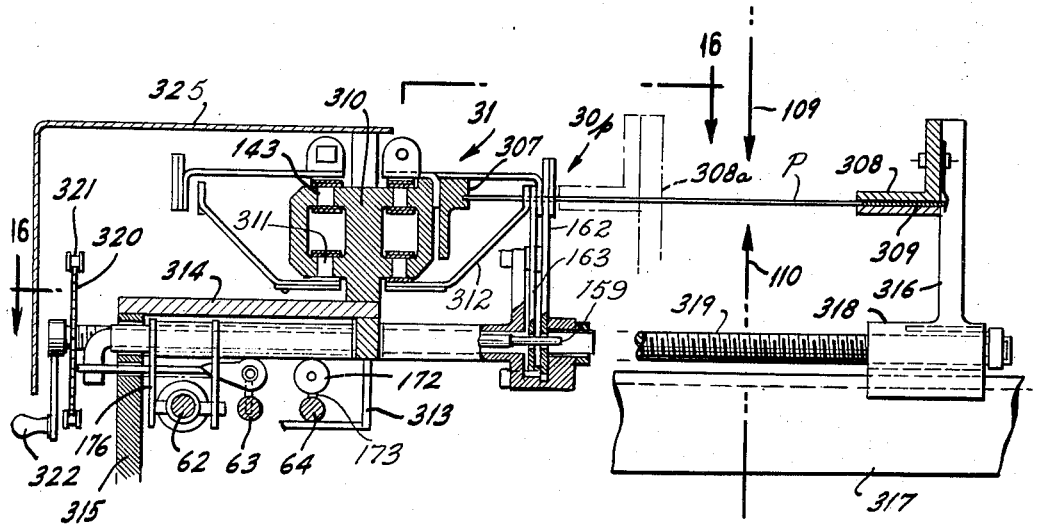

United States Patent Office 2,908,010
Patented Oct. 13, 1959

2,908,010

INSERTION MACHINE

John G. Lord, Swarthmore, and Charles W. Woods, Langhorne Manor, Pa., assignors to Philco Corporation, Philadelphia, Pa., a corporation of Pennsylvania Application January 16, 1956, Serial No. 559,335

29 Claims. (Cl. 1—101)

This invention relates to apparatus for mechanized insertion of circuit components in electrical circuit panels.

Mechanized fabrication of certain devices has been practiced for a long time. Thus it is well known to convey engine blocks or the like along a line-up tool machines such as drill presses and to interlock the machines in various manners. It has also been usual for many years to convey bottles, cans, etc. through various stations, for unsealing, sterilizing, filling, sealing, labeling, packaging and other operations, with provision for automatic inspection, sorting and the like. More recently, it has become desirable to adopt more or less similar methods in the fabrication of electrical circuit panels, mainly in connection with modern mass production of complex circuits, for instance for television and particularly color television. The panels for such circuits have problems of their own, not solved by the fabrication systems developed in different industries; nor is it believed that the problems contemplated herein were adequately solved by the special machines for fabrication of circuit panels, heretofore built and proposed.

One particular problem of the mechanized insertion of electrical components is due to an extreme multiplicity and variety of such components. The resistors, capacitors, coils, tube sockets and other components of control panels are not nearly as standardized as are ordinary cans or bottles or machine elements; they are subject to frequent change in design. Moreover, scores or hundreds of them are often involved in fabrication of each panel; scores or hundreds of panels are required for certain instruments; and thousands or millions of instruments are needed for civilian and military use. As a result, machines are needed which can rapidly insert different components. For instance it is desirable for certain applications that a machine should insert variously shaped components, in different orientations and in closely defined locations forming part of "printed" circuits, at a rate of at least about sixty to a hundred insertions per minute; and more rapid rates are desired in other cases. Such high speed operation usually should continue for many hours, days or even weeks, without significant interruption, in order to be economical.

However, dangers of interruption can never be entirely eliminated. The circuit components usually have thin and flexible connectors, such as axial lead wires, spring clips, etc. Many of these cannot be shaped, held and directed with any great or sustained accuracy. They may easily lack or lose their predetermined form, for instance because of the gradual blunting of tools in component preparing machines, because of distortion as a result of transport and feeding, or because of various other possible incidents of component handling prior to insertion. While many of these difficulties can be controlled by the makers of circuit components, there remains a certain amount of such trouble that must be dealt with, in one manner or another, incident to the operation of an insertion machine.

For this purpose, it is most realistic to provide an insertion and control unit which is able to automatically react upon foreseeable component trouble, as well as panel trouble, and to do so with speed and economy.

In this connection it is important to note that according to actual experience the occurrence of such trouble, relating to electrical circuit components, must be expected to repeat itself at an average rate of about one case in a thousand, or more precisely, at average rates dependent on the specific component and varying between one case in five hundred and one case in two or three thousand. Insertion of such components may have to be performed, as an example, by a machine having ten insertion heads, each performing one insertion stroke per second. In such case, insertion problems must be expected, as an average, approximately once in every one to two minutes of operation. If any rapid average speed of insertion shall be maintained, it is highly objectionable to stop the entire ten-head machine when such trouble occurs at only one head.

Yet a complete stopping of the machine, with or without alarm indication, was one of the best remedies for such trouble available up to now. The only other remedy was, such taping or other preparation of components as to reduce the incidence of trouble to a lower rate; this, however, only substituted preventive work often on thousands of components, instead of remedial work on about one component.

It is a general object of this invention to provide an automatic fabricating machine adapted to satisfy the requirements and to avoid the defects suggested above.

A more particular object is to automatically overcome emergencies caused by typical or unavoidable incidents. For this purpose the present machine provides a system of self-repair interlocks, adapted to normally maintain a certain normal program of fabricating operations and to re-orient such program during an irregular situation.

A further and closely connected object is to minimize losses of productive time; particularly such losses of time as are caused by the necessity of human supervision. The present machine is able to do so. This is facilitated by combining the program re-orienting features, referred to above, with the simple expedient of directly, mechanically interconnecting essential groups of operating and supervisory linkages. The interconnected linkages insure predetermined synchronization or correlation of periods of travel for all feelers, levers and similar control elements required for the various supervisory operations. Unusually rapid programming and re-programming is allowed by these combined features, thereby allowing the automatic correction of component trouble without complete stopping of the machine. Heretofore there was a strong trend in the design of mechanized fabrication plants, equipped with programming or sensing feelers or the like, to individually power each fabricating head by a pneumatic or hydraulic piston or the like, correlating the strokes of such pistons by pneumatic, hydraulic, electric or other circuitry. The correlating circuits were able to function rapidly, but the machine as an entirety was relatively slow, since all switches, valves, pistons, etc. were individually moved and accelerated and the program of the machine had to provide waiting periods to allow safe completion of cumulative motion periods for switches, valves and pistons, or equivalents, in each operating and supervisory function. Such waiting periods are substantially eliminated by the present machine.

A further object is to insure a high degree of versatility, particularly to provide such a machine which can insert components of a great variety of forms and other characteristics, which inserts them in panels of widely varying dimensions, at panel locations chosen with the utmost freedom, and in any desirable sequence of component insertions.

Still another object is to provide a high degree of accuracy in the performance of the machine; particularly to make sure that each component is inserted at a panel location defined as narrowly as possible, in spite of insertion problems created by looseness of lead wires, vibration of rapidly moving parts, and the like. In this connection, it is a feature of the machine that the panels under treatment are periodically stopped in their progress through the machine, at points accurately indexed relative to widely adjustable positions of tool heads and tools. According to another feature, such indexing can be re-established readily and accurately when it has been disturbed in connection with fabrication of different panels. Further connected features provide mechanical indexing linkage of improved design, including: sensitive panel stop and feeler members; effective signal transmission linkage; and compact but highly accurate clutch means, adapted to be controlled by such linkage and in turn to control such linkage.

A specific manner in which all these and other objects have been achieved will now be explained, in conjunction with the description of a preferred embodiment of a machine according to this invention, and with reference to the drawing appended hereto, wherein said embodiment is shown. In the drawing—

Figure 13 is an enlarged, perspective view of a detail from Figure 12.

Figure 14 is a detail section, taken along line 14—14 in Figure 13.

Figure 15 is a section through the transfer and supervisory linkage system of the machine, the section being taken along line 15—15 in Figure 2; and Figure 16 is a detail plan view of a panel pusher and stop, forming part of the transfer system, the view being taken along line 16—16 in Figure 15 and rotated through ninety degrees.

*The machine in general*

Figure 1:
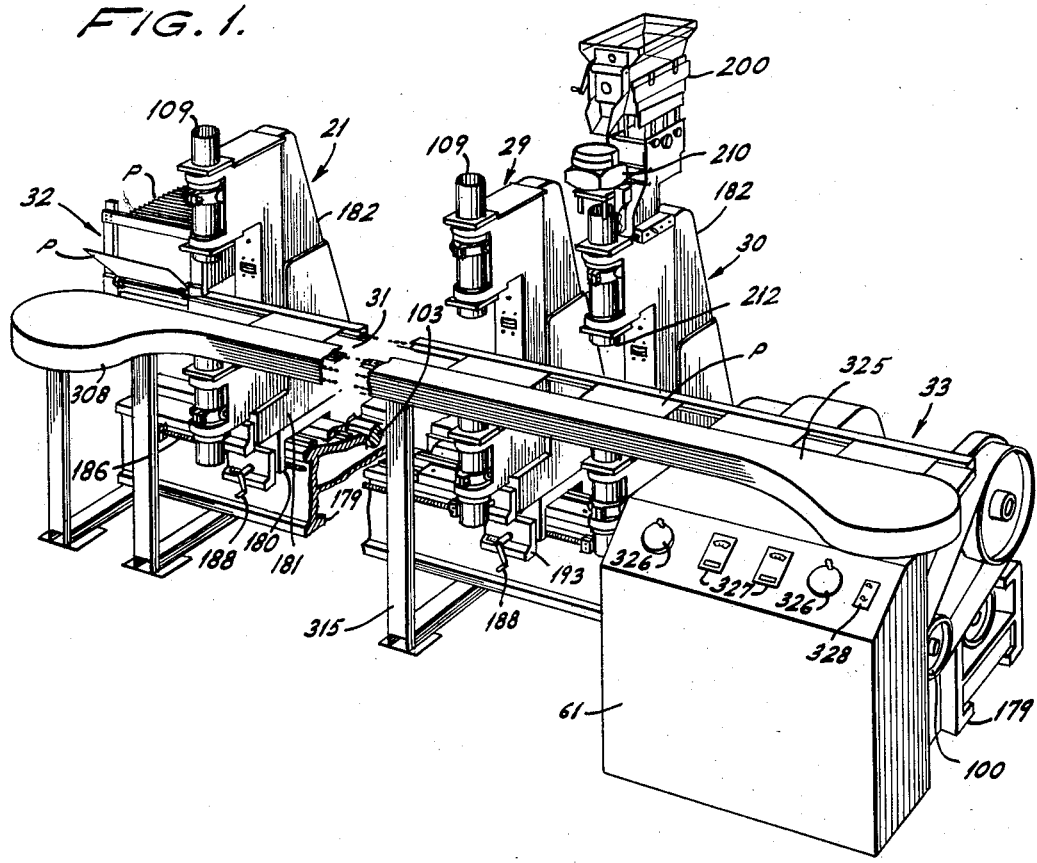
Figure 1 is a perspective view of the machine, with parts of the machine omitted for simplification, the view being taken diagonally from a position in front of the machine and near the right or downstream end of the panel transfer mechanism forming part of the machine.
Figure 2:
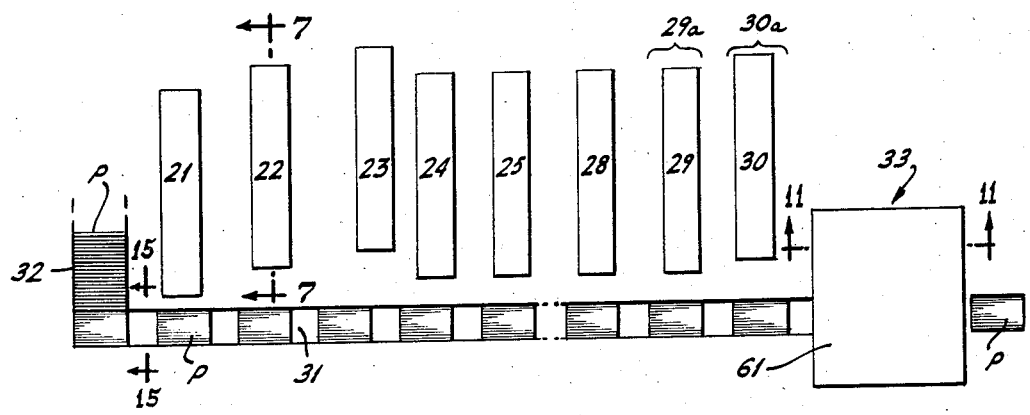
Figure 2 is a schematic plan view of the machine, again with the downstream end at the right hand.

Referring first to Figures 1 and 2: The machine comprises, as basic but only semi-permanent parts thereof, a series of ten tool heads 21, 22, 23, 24, 25 . . . 28, 29, 30. It comprises, as a permanent part, an elongated, horizontal transfer structure 31, extending along this series of heads, for transferring panels P to the tool heads. The panels may have so-called printed wiring thereon, either of the etched or plated type; however, wiring may also be inserted by the present machine.

The transfer structure 31 has an upstream end section 32 which is shown as being equipped with a mechanized supply station for bare panels without components. A supply station can be arranged, instead, for manual supply of panels and/or for supplying panels which already have some components thereon.

A drive head 33 forms part of the downstream end of the machine. It is equipped with rigid linkage members, suitably cooperating to supply power and both programming and program reorienting motion control to the tool heads 21, etc. and the transfer mechanism 31.

Panels P are shown in different positions. One such panel is about to be delivered from the supply means 32 to the transfer means 31. Other panels are positioned in this transfer means, in front of different tool heads, the panels being spaced uniformly for purposes of indexing, while the tool heads are spaced irregularly in order to insert each component at the proper point of each panel. Still another panel is shown in Figure 2 at a position downstream of the last tool head and drive head, where such panels can reach a suitable receiving station, not shown. Ultimately all panels, or suitably selected ones, can be transferred to areas of further fabrication, storage, packaging or use. If desired, they can also be recycled through the same machine, readjusted for further insertion operations.

Such further fabrication is desirable mainly in the many cases where each panel requires insertion of more components than can be handled by a compact arrangement of tool heads in one machine. In view of the particular problems of electrical components and panels a series of ten tool heads or more generally, from about five to about twenty-five tool heads, has been found to be most compact and efficient for present purposes. This may best be explained by briefly considering a concrete example, typical for many applications of this component insertion machine. It may be assumed, for instance, that a group of one million panels must be fabricated and that each panel requires insertion of one hundred different components. This can be achieved by a sequence of fabricating programs; that is, first processing the entire group of panels in a program of inserting ten components in each—which may involve about five working days of twenty-four hours each, for one ten-head machine operating at a rate of two insertions per second; then processing the same group in a second ten-head insertion program similarly performed by the same machine; and so on for a total of ten insertion programs, successively performed by the same machine in fifty working days. Of course, it may be preferable in some cases to complete this fabrication in fewer days, by simultaneously using a plurality of such machines. However, it is important also to properly arrange the number of tool heads in each machine unit served by one conveyor and by one control system.

Machines with appreciably fewer than ten tool heads tend to be slower, for a number of reasons; some of the main reasons being that it is necessary to manually adjust the machines more frequently and that less use is made of the possible correlation of linkage accelerations.

By contrast, machines with more than ten heads can be built, in accordance herewith, and their operation can be kept most rapid and efficient so long as a normal program is maintained. However, panel component insertion machines having substantially more than about ten to twenty-five heads, served by a single prime mover and/or a single control system, would be less compact. This means that the devices for mechanical transmission of power and/or control would have to be made very heavy and expensive, in order to maintain accuracy of indexing; and it also means that in case of emergencies, occurring in a few insertion heads, it would become necessary to temporarily inactivate a larger group of such heads.

In the past, individual tools or sometimes tool machines with from thirty to fifty heads were commonly provided for the fabrication of electrical circuit panels. Any manual repair which may require, for instance, an average of about four hours may postpone, for instance, completion of about 10,000 panels, in a relatively rapid fifty-head machine, whereas it postpones at most one-fifth of such completion if five ten-head machines are used.

This comparison is further improved in favor of the ten-head machine by the unitary drive feature, which is practical in a ten-head machine but not in fifty-head and similar mutilhead panel fabricating machines, as built in the past. Said prior machines, as mentioned, generally used an individual pneumatic or hydraulic prime mover for each insertion head. In such arrangements, both normal indexing and emergency operations were relatively slow, because of the uncorrelated nature of the required accelerations of all pistons and connected linkage. By contrast, the present grouping of mechanicaly interconnected operating elements allows extremely rapid, normal indexing and equally rapid performance of many, if not all, emergency operations.

It is further pertinent that many, if not all, of the operations of circuit panel fabrication can be performed by the present machine, or by successive units thereof. For instance such machine units may perforate the panels by suitable dies and may perform other preparatory operations, auxiliary to component insertion proper; and likewise, such units may test the inserted components or complete circuits and may perform other supplementary operations, auxiliary to component insertion proper. Any or all such operations are meant when broad reference is made herein to insertion or inserting, or when similar terms are used.

Figure 3:
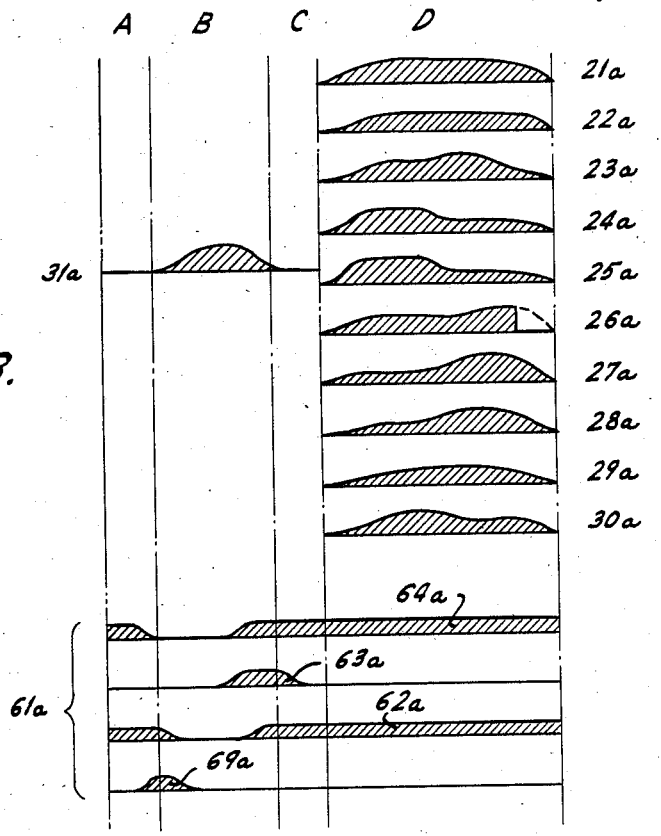
Figure 3 is a schematic graph of program functions and checking operations, constituting a cycle of the machine.

A substantially normal operating cycle of the present machine is graphically analyzed in Figure 3, for basic orientation. In this figure the horizontal width of column A represents a period of time, for instance one-twentieth of a second, devoted to checking the manner in which the ten tool heads have performed in a previous cycle. Similarly the column B signifies a subsequent time interval, devoted to the transfer of a panel P to each tool head 21, etc.; this may last for instance one-fifth of a second. The column C corresponds with a next following time interval, set aside for checking the transferring of panels to each tool head; this may again occupy a time interval approximately as long as that of function A. The fourth and last column D is reserved for the ultimate insertion operations of the different tool heads. The performance of such operations is suggested by a group of curves 21a to 30a in this column; it may require a time about as long as that for function B. Thus the complete cycle may occupy for instance one-half second, in the present machine. The main function, of course, is the insertion function D. It takes place during pause periods between transfer functions B. The supervisory functions A and C take place at moments substantially coinciding with the beginnings and ends of such pause periods D.

The transfer-checking operation C serves to automatically inspect the stream of panels at each tool head, and to re-orient the program when necessary in view of the condition of said stream. Such re-orientation is necessary mainly when, accidentally, an interruption or so-called "bubble" occurs in the stream of panels, at any of the tool heads. As such a bubble progresses through the machine, during a series of complete cycles occupying a few seconds, the heads receiving no panel should not attempt to operate, thereby avoiding subsequent tool head trouble, as well as loss of components; the other heads should operate normally. The machine is adapted to achieve this result, and further adapted to reset itself to normal operation immediately thereafter.

The insertion-checking operation serves to inspect the streams of components before, during and/or after insertion. Again, a "bubble" may occur in the component supply of any one head; and, in most cases of this kind, all other component insertion heads should be stopped, until said component supply has been re-established, for which purpose it is frequently best that the head in question should immediately make a series of automatic insertion attempts. In most cases, the reason for the component "bubble" lies only in a small and temporary defect, such as stoppage of a component supply chute, which may be caused for instance by a slightly bent axial wire of one component. In such cases the normal component flow can often continue after a few automatic insertion attempts.

Thus the insertion-checking may desirably lead to an emergency operation of one selected tool head and locking of the panel transfer system and other tool heads; whereas the transfer-checking may desirably lead to an emergency locking of one selected tool head and operation of the remaining system. The present machine is capable of such and similar automatic responses, with automatic resetting to normal program operation.

The economic significance of this feature is substantial. As mentioned above, panel and component trouble cannot be avoided entirely. Each occurrence of such trouble causes at least several minutes or perhaps even a score of minutes of repair time, in case of mere alarm and manual repair, whereas it causes only a few seconds' interval of automatic correction.

A detailed analysis of the function-checking and transfer operations is given at 61a; this will have to be explained hereinafter.

In column D of the present figure, curves of different shapes are shown, defining areas of different width. The slope of each curve indicates different total magnitudes of component-inserting effort which may be expended by each tool head, at each instant of the insertion operation, such different efforts being connected with the different bending loads and other loads, caused by components and lead wires. Exceptionally, as stated in the introduction, malfunctioning may occur, for instance because of a faulty lead wire or the like. Such an incident is indicated by the abrupt falling of the curve 26a toward the end thereof, instead of normal completion of the curve which is indicated by a dotted line. Such and similar incidents can be detected at once, upon the ensuing checking operations; and the machine can then initiate proper, temporary re-orientation of its automatic cycle. As a less desirable alternate or supplement, complete stoppage of a tool head can be provided, accompanied by operation of conventional alarm means, not shown.

Figure 4:
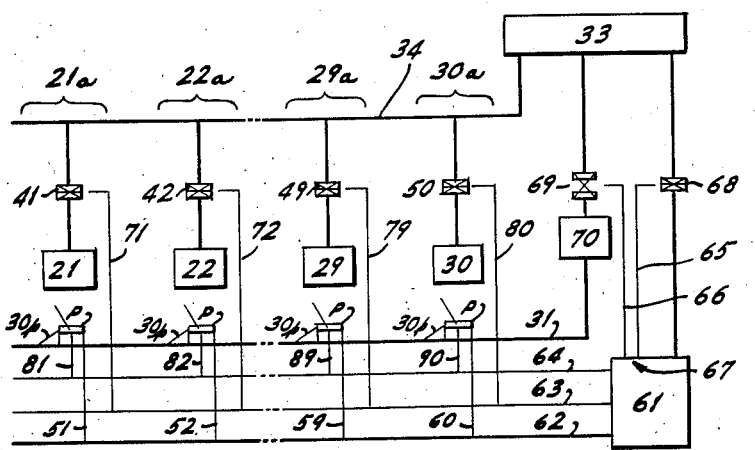
Figure 4 is a partial, schematic plan view of the machine, showing basic groups of the programming and program re-orienting mechanism.

Reference should now be made to Figure 4. This figure schematically illustrates a preferred combination of basic operating and interlocking means, whereby the machine carries out its normal programming and the automatic readjustments of such programming. The present illustration is limited to some of the parts 21 to 33 but is otherwise similar to Figure 2.

The drive head 33, forming a permanent part of the machine, actuates unitary power transmission equipment 34, the motion of which is transmitted to the individual tool heads 21 to 30 by corresponding clutches 41 to 50. The drive head 33 also actuates the transfer mechanism 31, forming another permanent part of the machine. This mechanism propels panels P by a longitudinally movable series of pushers 30p, whereas there is provided a longitudinally stationary system of panel indexing and stopping fingers 51 to 60, one opposite each tool head 21 to 30, for stopping and releasing panels P at predetermined points and times and for cooperating in detecting the arrival or non-arrival of panels at such points. A supervisory cam mechanism 61 is provided, as a further permanent part of the machine. It comprises, as cam followers: a "transfer stop rod" 62 for intermittently activating and inactivating said panel stopping fingers; a "tool lock rod" 63 for starting and controlling the transfer checking and potentially tool locking operation C, explained above; and a "transfer lock rod" 64 for starting and controlling the insertion checking and potentially transfer locking operation A, also explained above. A pair of clutch linkages 65, 66 are also provided as cam followers, in a clutch section 67 of the mechanism 61; they control respectively a clutch 68, in the power supply of the supervisory cam mechanism 61 itself, and a clutch 69, in the power supply of the panel transfer means 31. An acceleration control 70 is closely associated with said clutch 69 for the transfer means 31. A series of tool lock linkages 71 to 80 connect the tool lock rod 63 with the head clutches 41 to 50 respectively; and a series of transfer lock linkages 81 to 90 connect the transfer lock rod 64 with certain parts associated with the tool heads 21 to 30 respectively.

Advantageously, the program cam clutch 68 is of a normally engaged type, which Figure 4 suggests by showing clutch members in contact with one another with a cross superimposed. By contrast, the transfer clutch 69 is of such a construction that it requires positive actuation before it engages; that it then normally maintains the engaged position until a transfer stroke from each tool head position to the next has been completed; and that it then always disengages. This construction is indicated by showing clutch members separated from one another, with superimposed crossed lines. The tool clutches 41 to 50 are normally engaged, like the transfer clutch. Disengagement and re-engagement details of these several clutch means 68, 69 and 41 to 50 differ widely, in a normal program; and in an irregular program, there are differences even between the manners in which the several tool clutches 41 to 50 function. All this will be described hereinafter.

The area in which a tool head is positioned is referred to as tool station. In accordance with this invention a typical tool station 30a comprises, as equipment auxiliary to its tool head 30: a head clutch 50, a transfer stop finger 60, a tool lock linkage 80 and a transfer lock linkage 90. When the tool head 30 is shifted in and relative to its station 30a, as indicated in Figure 2, essential parts of the auxiliary equipment (60, 80, 90) can and should retain original, permanently indexed positions, while other auxiliary equipment (50) may be automatically shifted with the tool head. Thus the tool head stations are uniformly and permanently spaced from one another, while the position of each head, in its station, is adjustable, depending on the exact panel portions to which it is to be indexed during an insertion program.

By means of these arrangements, the machine provides, among other things:

(1) Normal alternation between (a) strokes of the group of tool heads 21 to 30, with clutches 41 to 50 and 68 closed and clutch 69 open, and (b) strokes of the transfer mechanism 31, with clutches 41 to 50 closed but ready to open and 68, 69 closed;

(2) Normal performance of a program of panel transferring, transfer checking, tool head manipulating and tool manipulation checking operations A to D, mainly by the supervisory program cam mechanism 61 and supervisory cam follower rods 62, 63, 64;

(3) Automatic remedial correction of the normal program in case of a malfunction; particularly (a) incapacitating an individual tool head during a given cycle under certain conditions, for instance a bubble in the panel supply, by clutch and clutch linkage means 50, 80, or (b) incapacitating the transfer mechanism and thereby all but one individual tool head, during a cycle or series of cycles of said individual tool head, under certain conditions, such as a bubble in the component supply of said individual tool head, by linkage 90; and (4) Manual and other adjustments and modifications of many or all of the above-mentioned functions (1) to (3), as will be described hereinafter.

Figure 5:
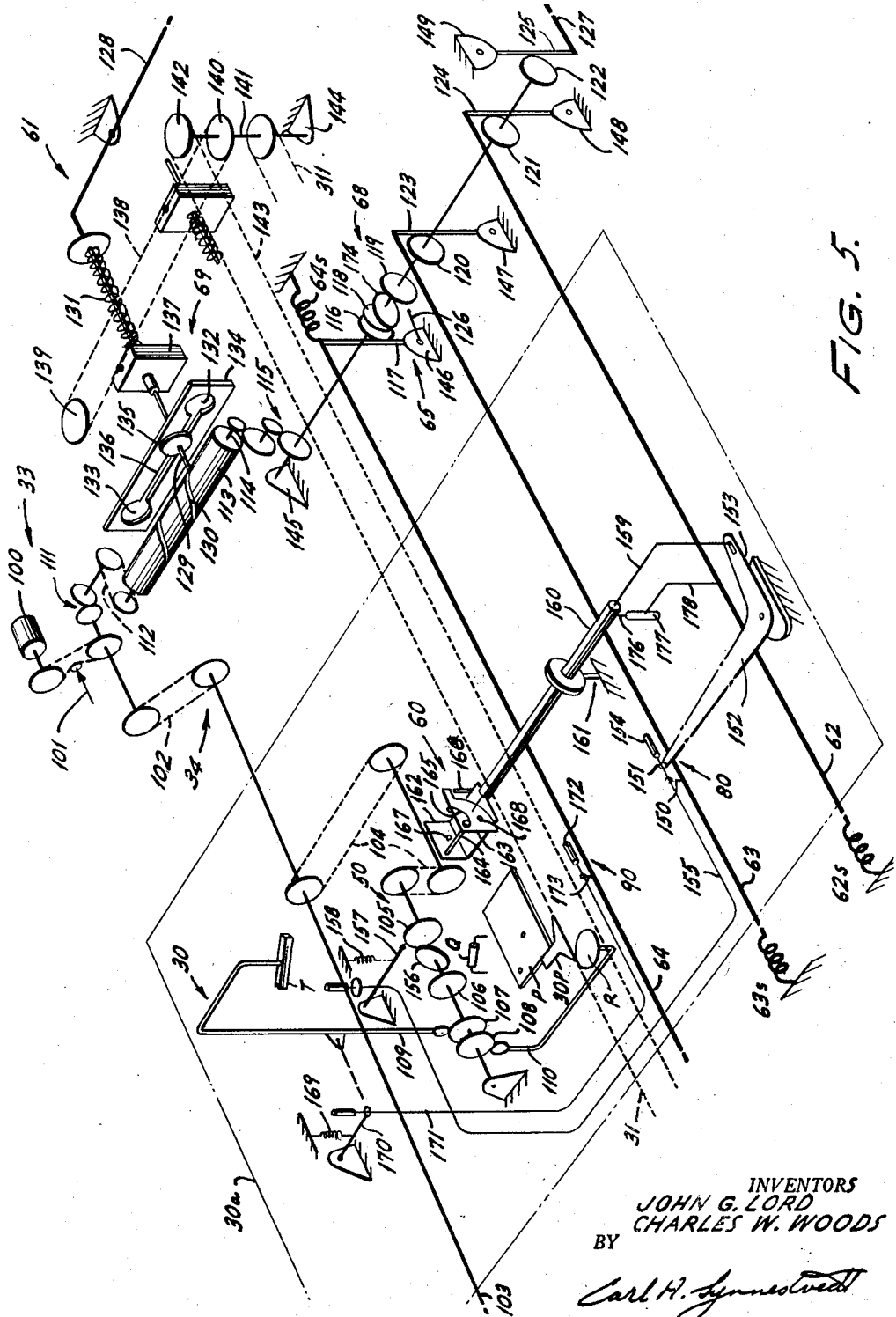
Figure 5 is a somewhat more detailed, perspective view, showing a more limited part of the machine, adjacent the downstream end thereof, the view being taken diagonally from a position in front and upstream of the parts shown.

For a more complete illustration of the transfer actuating and supervisory linkages 31, 61, etc. and of a tool station containing a tool head 30, reference should now be made to Figure 5.

As shown in this figure, the prime mover 33 comprises a motor 100, which by means of adjustable speed drive 101 and transmission mechanism 102, rotates a shaft 103 extending along the series of tool stations. This shaft, by transmission means 104, rotates the driving member 105 of the clutch 50 of tool head 30. The driven member 106 of this clutch has a pair of cams 107, 108 connected therewith, whereby it is adapted to reciprocate upper and lower ram members 109, 110, respectively, against biasing forces of springs or the like, not shown. The upper ram 109 serves, by a tool T—a non-permanent part of the machine—to insert a component Q in a panel P; and a cooperating tool or anvil R may be carried by the lower ram 110.

The prime mover 100 and variable speed drive 101 are also adapted, by beveled gears 111 and transmission 112, to drive a drum cam 113 which constitutes a principal part of the aforementioned transfer clutch 69. The shaft 114 of this drum cam, by speed reduction gearing 115, drives a transfer lock control cam 116, having a cam follower lever 117. The gearing 115 also drives a driving clutch disc 118 for the aforementioned program cam clutch 68. The driven disc 119 of this latter clutch drives three further cams 120, 121, 122, which, respectively, are equipped with cam follower levers 123, 124, 125.

The first cam follower lever 117 has an arm 126, forming a bell crank therewith and serving as a clutch dog for the program clutch 68. The transfer clutch 69, on the other hand, is operated by linkage 127, 128, connected with the last cam follower lever 125, as will be described hereinafter. (It may be noted at this point that the cam follower linkage 117, 126 constitutes the aforementioned clutch control 65, whereas the cam follower linkage 127, 128 provides the aforementioned clutch control 66. It may further be noted that the four cams may be identified respectively as transfer lock cam 116, tool lock cam 120, transfer stop cam 121 and transfer start cam 122.) The transfer lock rod 64 is biased in a direction toward the downstream end of the machine, by a spring 64s, thereby biasing the dog 126 downwardly and away from interference with the normally engaged program clutch 68. The tool lock and transfer stop rods 63, 62 are biased in the opposite direction, by springs 63s, 62s; and the transfer clutch rod is similarly biased for normal disengagement of the transfer clutch 69 at a certain point of the cycle, as will now be described.

The drum cam 113, forming part of the transfer clutch 69, can be engaged by a drum cam follower 129, fitting into a slot 130 on the drum cam; and the parts 129, 130 are shown as being so engaged. Such engagement must be established against the action of a spring 131 which tends to move the follower 129 out of the slot 130 of the drum cam and thus to disengage the transfer clutch. Engagement between the drum cam and its follower is initiated by the transfer clutch engagement cam 122, which, by follower 125 and linkage 127, 128 is adapted to move the follower 129 into the slot 130, against the pressure of the spring 131. However, such engagement can be established and broken only at certain starting and stopping end positions, shown at 132, 133, respectively. Here, a shield plate 134, extending parallel to the drum cam 113, has apertures of such shape and size as to allow the drum cam follower 129 or an obstruction member 135 thereon to move through said apertures, toward or away from the drum cam. Between said end positions 132, 133, the drum cam follower 129 can move along the drum cam 113, but not toward the same or away from the same, by means of said shield 134 and a narrow slot 136 therein, which slot connects the wider apertures 132, 133.

Such longitudinal movement of the drum cam follower 129, is caused by the slot 130 in the revolving drum cam and is communicated to a drum cam follower block 137, secured to an endless chain 138 which runs over end sprockets 139, 140. One of these sprockets is fast on a transfer drive shaft 141, which also has a sprocket 142 secured thereto, driving a long panel transfer chain 143. One run of this chain moves along the machine, toward the downstream end, and serves as the aforementioned panel transfer device 31. At the upstream end the chain runs around another sprocket, not shown. Of course, suitable bearings 144 to 149 are provided for the various sprockets, shafts and levers.

A somewhat more detailed résumé of a complete cycle of the machine can now be given. The cycle comprises: A transfer phase, wherein the transfer chain run 31 moves downstream for a stroke the length of which equals the uniform distance between the tool head stations (function B of Figure 3); a transfer checking phase, following thereupon, performed mainly with the aid of the tool lock rod 63, pursuant to previous preparation by that rod and other parts (function C); a component insertion phase, wherein an operating stroke is performed by each tool head not then incapacitated by the tool lock rod 63 and linkage 71 to 80 (function D); and an insertion checking phase, mainly by the transfer lock rod 62 and linkage 81 to 90, pursuant to preparation by several parts (function A).

As to the speed of the various parts: a complete cycle advantageously involves one revolution of each driven tool clutch member 106. This may correspond for instance to three revolutions of the common tool drive shaft 103, depending on details of transmission 104. A complete cycle may also involve six revolutions of a suitable drum cam 113, two of which may serve for transfer purposes while the cam may idle during four of its revolutions. The cam shaft 114 may drive reduction gearing 115 to effect one revolution per cycle for the program cams 116, 120, 121, 122. By suitable transmission 102, 111, 112, these several rotations may be correlated with a suitable, normal, rotational speed of the prime mover 100, such as eight revolutions per second. By the variable speed drive 101, the speeds of shafts 103, 114, and respective parts connected therewith may be changed; for instance the duration of a complete cycle of the present machine may thus be caused to range from a quarter of a second to one second.

In view of the drive arrangements described above, the rotation of the drum cam 113 and transfer lock cam 116 is continuous, whereas rotation of the other program cams 120, 121, 122 and of the tool cams 107, 108 depends on continued engagement of their normally closed or single-revolution clutches 68, 50.

The supervisory instrumentation for the control of these clutches, and particularly tool clutch linkage 80, will best be described by tracing it from the tool lock rod 63. This rod carries, in the tool station 30a, an eylet member 150. The eye of this member is suitably aligned with an eye 151 at one end of a lever arm 152, which arm forms a horizontal bell crank with another lever arm 153. These eyes are further aligned with a collar or plug 154, secured to a choke wire cable 155. The cable is suitably guided, for instance by a flexible conduit, not shown, to the tool head clutch 50. Here, between the tool clutch discs 105, 106, there is installed a clutch engagement member 156, biased toward engagement of the two discs and rotatable with said discs, but adapted at one point of such rotation to disengage the clutch discs if and as a dog 157 is placed in a predetermined position relative to the engagement member. A spring 158 tends to hold the dog 157 out of said predetermined position, but the dog is forced into striking position by the cable 155, in manner to be described hereinafter. Thus the parts 150, 151 and 155 to 158 constitute the aforementioned tool clutch linkage 80.

We must now trace the effect of the bell crank parts 152, 153 interposed on this tool clutch linkage. For this purpose it must be noted first that a downstream stroke of the tool lock rod 63 causes a downstream impact of eyelet member 150 on lever arm 152, thereby causing clockwise rocking of the bell crank 152, 153; and that the arm 153, when so rocking, is adapted to shift a tumbler pin 159 through a pipe 160 in a forward direction, away from the tool head 30; whereas upstream return of the rod 63 tends to reverse this shifting of the tumbler pin, if allowed by other parts. The pipe 160 is rotatably mounted at 161. It extends, across the system of rods 62, 63, 64 and chain 143, from adjacent the bell crank 152, 153 into the area where the panel pushers 30p shift panels P to the successive tool heads. In this area, one end of the pipe 160 has the aforementioned stop and indexing finger structure 60 mounted thereon. This structure comprises a stop finger element 162, rigidly mounted on the pipe at right angles thereto, and a movably mounted sensing finger element 163 which can rock, in a plane parallel with the rigid finger element, on a pivot 164 secured to the rigid finger element. A spring 165 tends to rock the rocking finger element 163 in an upstream direction, until said element hits a stop 166 secured to the rigid finger element 162. The two finger elements 162, 163 have, respectively, holes 167, 168 therein. These holes provide a sliding fit for the tumbler pin 159 when, and only when, the rocking finger element 163 has been displaced a certain distance downstream from the stop 166, against the pressure of the spring 165, by the arrival of a new panel P. Failure of a new panel to arrive incapacitates the tool head in question, and only this particular tool head, by virtue of the fact that its bell crank 152, 153 is stopped at 163, thereby stopping its collar 154 from moving upstream and stopping its members 155 and 158 from moving upwards, which in turn stops the tool head clutch dog 157 from being moved upwards in due course thereafter. The exact manner in which the dog 157 is controlled will be described hereinafter.

Thus the combined members 152, 153 and 159 to 168 serve to detect the arrival or non-arrival of a new panel P in the tool station and accordingly to control the tool head clutch linkage 80. More particularly, if a new panel arrives, it aligns the holes 167, 168 in the fingers 162, 163, thereby allowing the tumbler pin 159 to be moved backwards and thereby in turn allowing engagement of the tool clutch 50. If no panel is present in a station, pursuant to the described motions of tool lock rod 63, the bell crank of that station is not allowed to be moved in the manner just mentioned. This crank would be free so far as the tool lock rod is concerned; but it is to be stopped from completing its movement, by the finger 163. As a result the corresponding head clutch 50 is disengaged by linkage to be described hereinafter; at the present point it is only intended to explain the more basic parts and functions.

In a somewhat similar manner the machine is adapted to detect conditions prevailing in or at any tool head which are to be signalled to the supervisory mechanism 61 in order to temporarily incapacitate the entire machine except for continued cycling of the tool head in question. Specific conditions which can thus be signalled, and specific linkages for the same, will be described hereinafter. For the moment, general reference is made to a spring 169 in the tool head 30, adapted normally to hold a detector lever 170 in raised position and thereby to hold a second choke wire cable 171 in raised position. This tends to hold a collar or plug 172 in an upstream position; the cable being guided in manner similar to that employed for the other cable 155. An eyelet member 173 is mounted on the transfer lock rod 64, directly upstream of the plug 172. Predetermined types of trouble condition in the tool head have the effect, by linkage to be described hereinafter and here only suggested by a dotted line from ram 109 to lever 170, that the lever 170 is held in raised position, similarly holding the cable 171, the transfer lock rod 64 and thereby the transfer lock cam follower lever 117 against a force provided by the transfer lock rod spring 64s. The program clutch dog 126 then interferes with a clutch engagement member 174, in manner similar to that described as to member 156. Program dog 126 disengages program clutch engagement member 174, at a predetermined point of the rotation of the latter, thereby stopping the driven disc 119 and the program cams 120, 121, 122 at said point, and only at said point, of their rotation; all this as an effect of said trouble condition in the tool head 30. Thereupon the permanently rotating cam 116 and driving disc 118 are simply allowed to idle.

The signal so transmitted stops the transfer mechanism, but only upon the completion of any transfer cycle then in progress: that is, the drum cam 113 continues to shift its then engaged follower 129 until it disengages in normal manner at the slot end 133. Thereafter, and until the trouble has been remedied in manner to be described, the drum cam does not drive any follower block 137 any more, since the transfer starting, drum follower engaging cam 122 is at rest. From then on, no driving effort is applied to the chains 138, 143, so long as the program clutch remains open. This inactivation of the transfer means 31 also tends to prevent all tool heads 21, etc. from being activated thereafter; it being normally necessary for such activation that the clutch dog 157 of each tool head, after utilization thereof at the end of each cycle, be positively removed from the path of its clutch engagement member 156, by a drive head actuation starting with the arrival of a new panel, as described. However, the signalling head is desirably caused to continue cycling, as will be described hereinafter, so that the inactivation of the machine is only partial.

After such partial inactivation, and also after each normal insertion operation, panels P must be moved on toward the downstream end. For this purpose it is necessary not only to resume or continue operation of the transfer means 31, by a lowering of tool head lever 170 and cable 171, as will be described, but also to remove the aforementioned stop finger mechanism 162, 163 from the path of the panels P. For this latter purpose the supporting pipe 160 is shown as being secured to a lower end of said finger mechanism and as having a depending crank arm 176 with a slot 177 therein, engaged by a bent pin 178, which pin is secured to the stop rod 62 in the tool station 30a. The stop cam 121 is adapted at the start of each transfer operation to allow the stop rod 62 to move a short distance upstream, thereby to move the crank 176 in an arcuate upstream direction and thereby, in turn, to move each finger structure 162, 163 in an arcuate downstream direction, away from the panel P previously stopped thereby, which panel can then be moved downstream by its pusher 30p. Before each panel next reaches any tool head, downstream of that illustrated, all cranks 176 and all finger structures 162, 163 are returned to their illustrated position, by the stop rod. There follows another cycle of operations at each station as described above, that is, checking whether a new panel has arrived, thereby allowing or disallowing operation of the tool head at the proper phase of the cycle, performing such operation if allowed, checking whether all tool heads have functioned properly, and thereby allowing or disallowing further repetition of these successive cycling phases.

*The tool heads*

Figure 6:
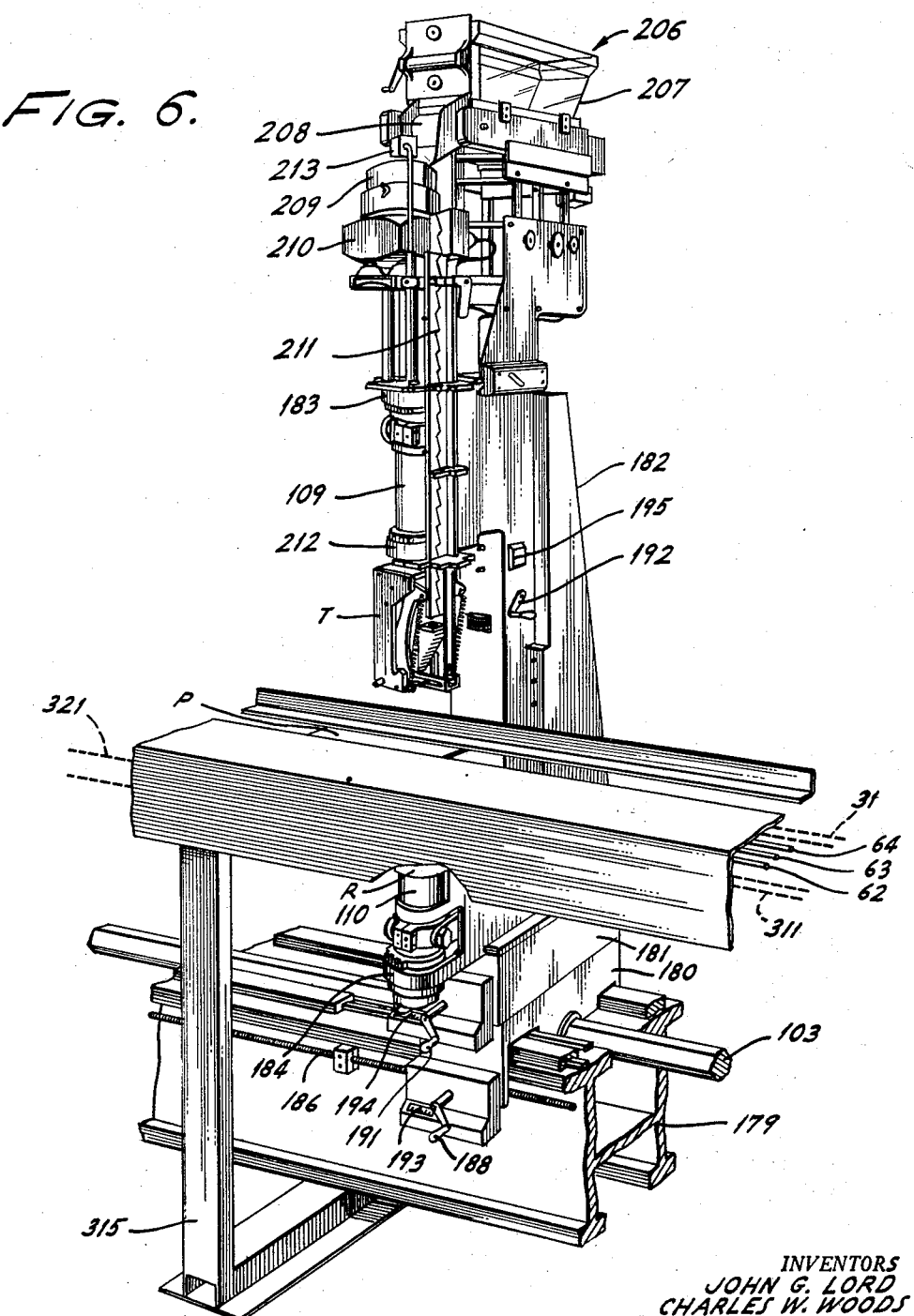
Figure 6 is a perspective front view of one of the tool heads of the machine.
Figure 7:
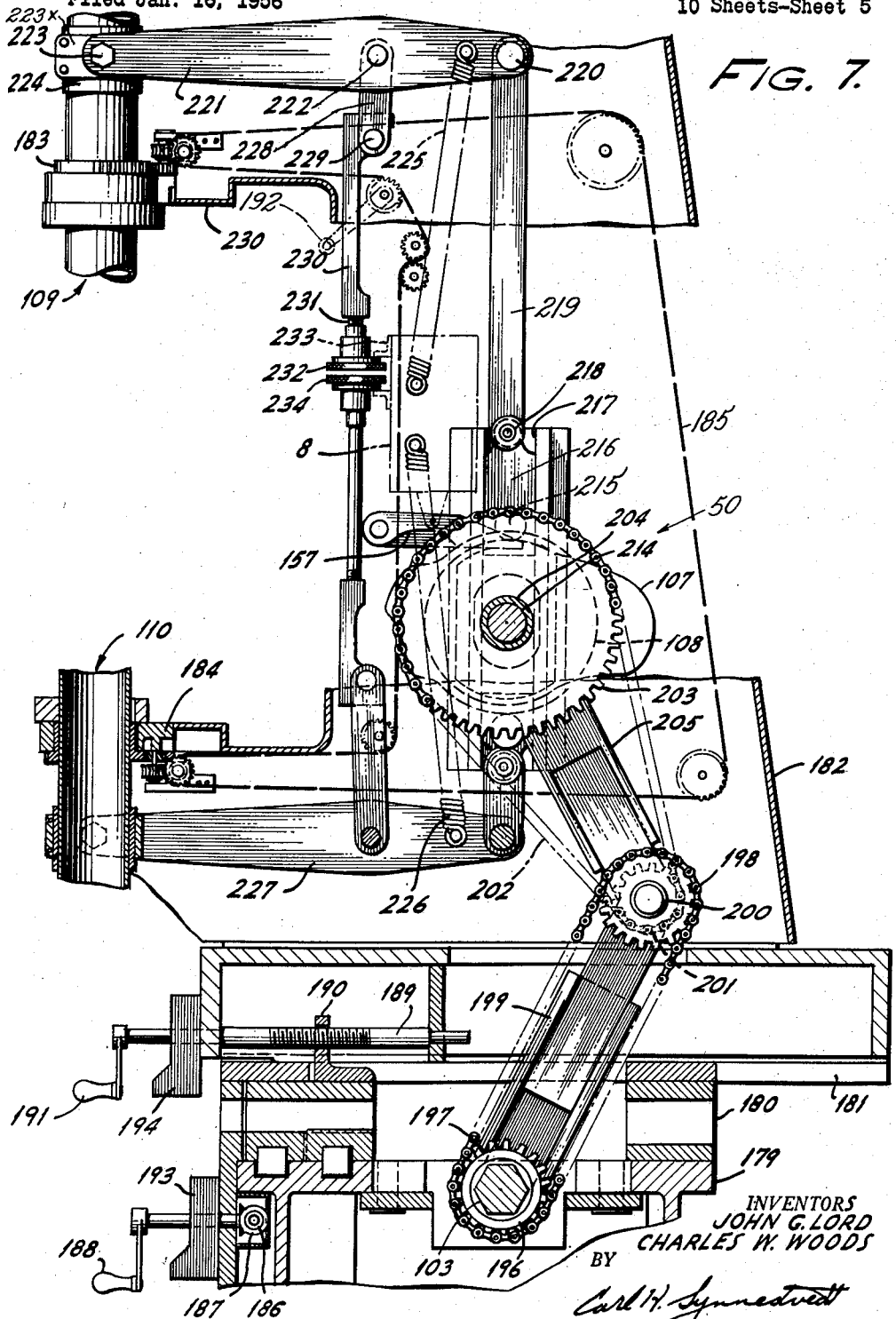
Figure 7 is a fragmentary sectional side view of such a tool head, on a larger scale, the section being taken along line 7—7 in Figure 2.

Referring now to the more detailed illustration of a tool head in Figures 6 and 7: The head is mounted on an elongated, rigid, horizontal support base 179, which extends in a direction parallel to the transfer structure 31. Each head is mounted on this base in a manner allowing freedom of adjustment of the head, at least in a horizontal plane, while keeping all tool heads able to receive power through the aforementioned tool drive shaft 103 and to receive control correlation through the aforementioned rods 63, 64, etc. For these purposes the support base 179 has mounted thereon a primary sub-base or carriage 180 for each tool head, slidable longitudinally of the base, that is, upstream and downstream, within the limits of the tool station. For the same purposes each primary carriage 180 has a cross slide or secondary carriage 181 slidable thereon, forwardly and backwardly, that is transversely of the main support 179 and of the transfer structure 31. Each tool head comprises a substantially C shaped frame 182, bolted to the secondary carriage. Each C frame 182 comprises, as upper and lower parts thereof, press ram guide members 183 and 184 respectively. These guide members of each tool head have a common vertical axis and are horizontally rotatable about such axis. Rotations of the upper and lower ram guides of any one head are correlated by suitable linkage, such as a chain and sprocket transmission 185. Thus it is possible by means of the members 180 to 185 to adjust each tool head, individually, so as to aim its tool T at any desired section of each panel P and to select any desired horizontal angularity between each panel and the tool; the panels being transferred horizontally, at an elevation between the upper and lower ram guides and being stopped at properly predetermined positions, by the aforementioned guide, cam, rod and finger mechanism.

Advantageously the machine is arranged so that the individual adjustments of all tool heads can be performed rapidly, accurately, and safely, by a minimum number of moving parts, and that such individual adjustments can be readily reproduced in order to allow, for instance, resumption of a program of insertion cycles on a new batch of panels, after performance of other programs on previous batches. For these purposes there are provided micrometer and indicator means for each of the three adjustments of each head. Particularly, an elongated, lead-screw or threaded spindle 186 extends horizontally along the head support 179; and in each tool head, the lead-screw is engaged by a bevel gear actuated nut 187, operable by a handle 188 to shift carriage 180 along frame 179 (see Figure 7). A similar lead-screw 189 extends transversely of the machine in an upper part of each primary carriage 180, formed by a meshing nut 190, and can be rotated by a second handle 191 to shift frame 182 along carriage 180. In addition, each tool head has a third handle or similar member 192, adapted to operate the chain mechanism 185 for coordinated, angular adjustment of the upper and lower ram guides 183, 184. The three adjustment handles 188, 191, 192 of each tool head, desirably with a unitary lock, not shown, are installed in easily accessible positions on or adjacent the front of the tool frame 182; and they are interconnected with easily readable indicator means 193, 194, 195, respectively (Figure 6), whereby the number of turns and fractional turns of each handle, counting from a preselected starting point, can be shown, thereby providing a convenient means to identify the position of the respective tool head, relative to its station, as employed during any specific insertion program.

Thus it is possible for instance to provide a machine wherein tool stations uniformly have eighteen inches length (in upstream or downstream directions). Said stations may be for instance six inches wide, in forward or backward directions, exclusive of the corresponding dimensions of the C frames 182. Each frame may occupy for instance one-third of the length of its station, thereby allowing twelve inches longitudinal adjustment of the tool head within the station. Such a machine is able to insert components in panels of any size up to six by twelve inches. The position of each tool head in its station can be identified by suitable coordinates, starting for instance at the upstream end of the station, for the longitudinal positioning; starting in front of the station, for the transverse positioning; and starting at a suitably selected zero point, for clockwise rotation of each set of ram guides. In this manner, the position maintained by each of the ten insertion heads, in any one program, can be fully represented, for possible future re-establishment, by a series of numbers, which can for instance be tabulated as follows:

| Tool Head | Indicator 193 | Indicator 194 | Indicator 195 |
|---|---|---|---|
| 21 | 6.30 | 10.75 | 45.00 |
| 22 | 3.00 | 10.75 | 130.00 |
| 23 | 11.35 | 8.55 | 130.00 |
| 24 | 9.75 | 8.55 | 32.30 | etc.

Coordinated rotary motion is supplied to all tool head clutches, while allowing these adjustments of tool head positions. For such co-ordination, as shown in Figure 7, the aforementioned principal tool head drive shaft 103 has, in each tool station, a drive sprocket 196 slidably mounted on the shaft and rotatable therewith, by means of any suitable keying or slidable fastening arrangement. An endless chain 197 connects the slidable drive sprocket 196 with an idler sprocket 198, pivoted on a rigid arm 199 which is swingable about the main drive shaft 103 and slidable with the drive sprocket. The idler sprocket 198 is fixed on a stub shaft 200, as is a second idler sprocket 201; and another endless chain 202 connects the second idler sprocket with a driven sprocket 203, secured to the aforementioned driving clutch member 105 by a shaft 204; a rigid arm 205 being pivoted to the shafts 200, 204. This mechanism insures rotation of all cam shafts 204 in accurate angular correlation with the main drive shaft 103 and thereby with the drive head 33 and transfer mechanism 31, regardless of the different tool adjustments. Thus the different tool heads can be driven in tool strokes accurately associated with one another, for instance simultaneously (see Figure 3, column D). The parts 196 to 204 constitute a preferred form of the aforementioned transmission means 104.

At least one supply structure 206 for one type of panel components is removably and adjustably secured to the top of each tool head, as best shown in Figure 6. This component supply is here shown as comprising a primary supply container or trough 207 which may be made of transparent material as shown, and an endless belt conveyor 208, installed at the bottom of the trough and adapted by a suitable motor or power take-off, not shown, to convey batches of the components forwardly into the open top of a secondary supply container or bucket 209. This bucket is adapted, for instance by well-known vibrator means 210, to feed a stream of properly oriented, successive components in rapid, intermittent, downward feed strokes to the inlet of a chute 211, leading them to the insertion tool T. The tool is attached, by a quick-connecting mechanism 212, to the upper ram 109, slidable up and down in the upper ram guide 183. The tool T may be adapted, for instance, to form and insert a pair of so-called axial lead wires of rod-shaped component members. Details of such and other tooling are incidental hereto and in no need of particular description herein. This applies also to the matching lower press ram 110, slidable in guide 184. An electric eye 213 may be provided to detect any depletion of the supply of components in container 207 or 209.

A preferred tool head actuating mechanism according to this invention is best shown in Figure 7. The aforementioned clutch 50 is centered on the aforementioned driving shaft 204, which is hollow and has a driven shaft 214 rotatably mounted therein and projecting therefrom to an area where the aforementioned ram cams 107, 108 are keyed to the driven shaft. An upper ram cam follower 215 is mounted on a desirably long and dovetailed guide block 216, slidable in a vertical track member 217 which forms part of the C frame 182. A pin 218 connects the guide block 216 to a link 219; and a second pin 220 connects this link to an upper ram actuator lever 221, pivoted at 222. A further pin 223 is, by key member 223X thereon, in horizontally slidable engagement with a pair of jaws 224 on the upper ram 109. A return spring 225 is so installed as to tend to normally raise the upper ram. Similar arrangements are shown for the lower ram 110, which normally is lowered by a spring 226, subject to lifting by the forward end of a lever 227 controlled by the aforementioned cam 108. Advantageously there is provided a ram stroke adjustment device; this may comprise a bearing block 228 for each ram pivot 222. A horizontal pin 229 connects said block with a link 230 and one end of said link has a vertical, threaded stud 231. An internally threaded knob 232 engages said stud, while suitable means 233 hold the knob against vertical displacement. A similar knob 234 can be provided for the lower ram link pivot; and the two knobs can be rotated independently of one another, so as to allow independent adjustment of the vertical positioning of the tool T and anvil R at the end of each tool stroke.

Figure 8:
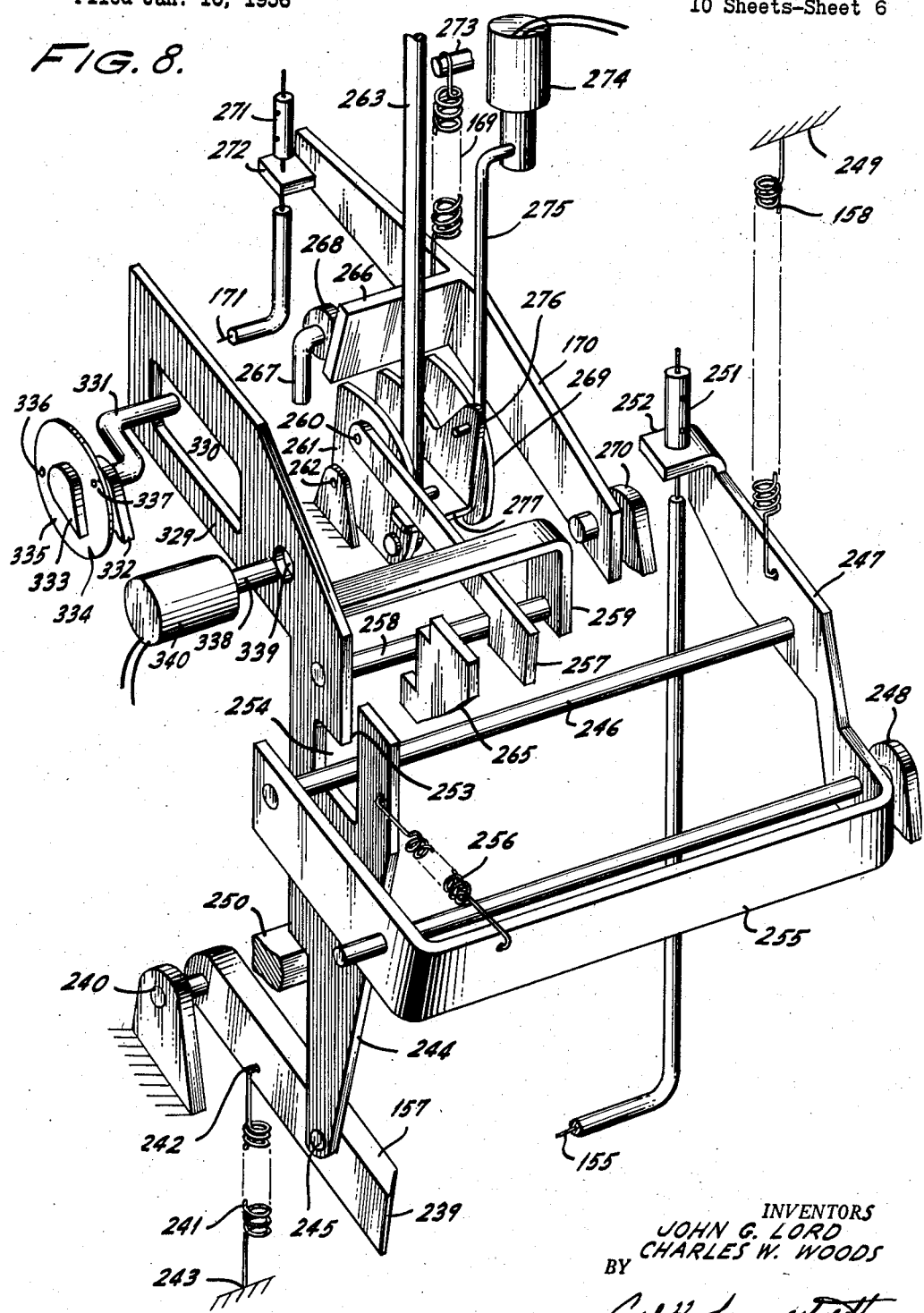
Figure 8 is a perspective rear view, on a still larger scale, of a control linkage unit in such a tool head; said unit being schematically shown at 8 in Figure 7.
Figures 9, 10:
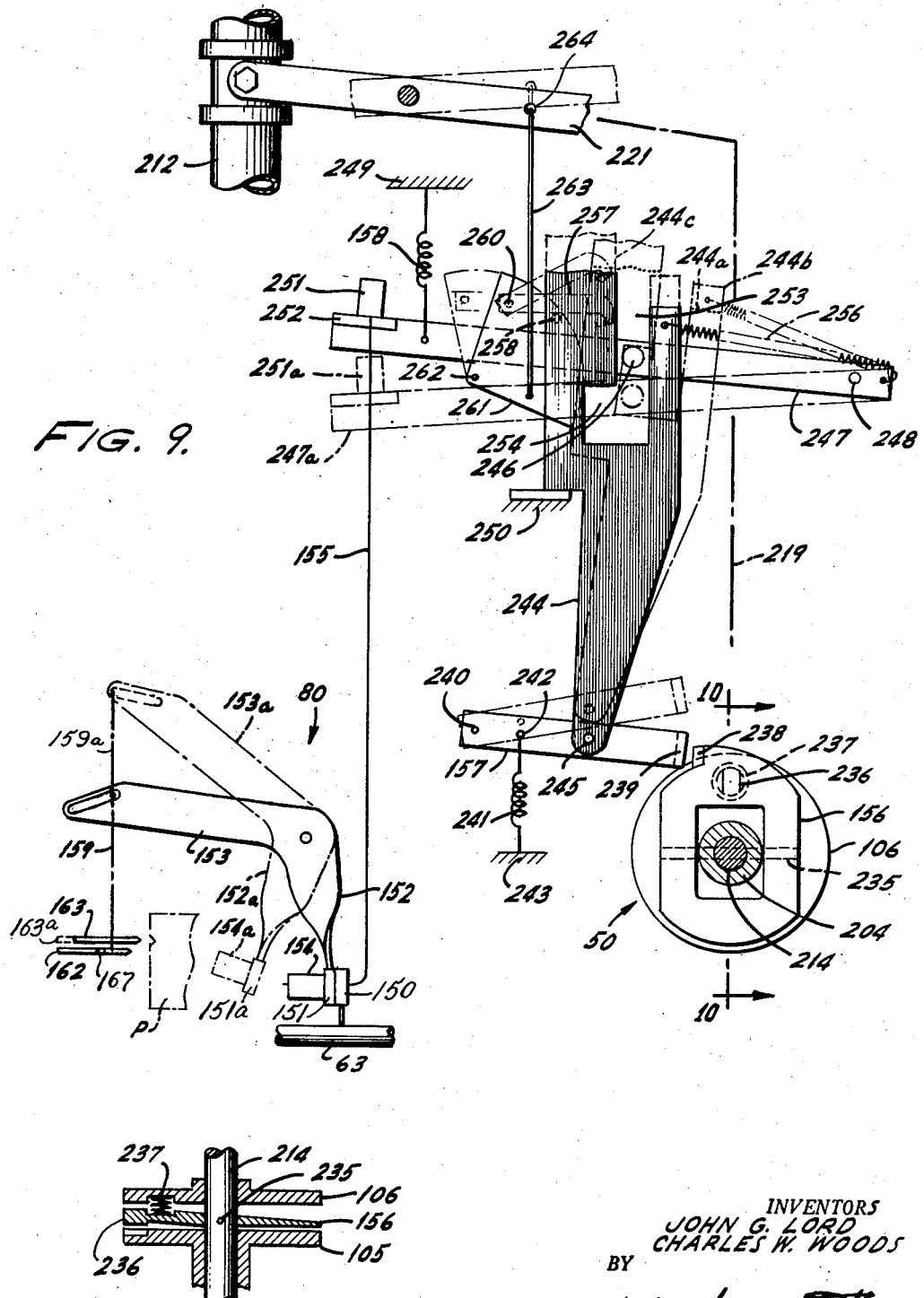
Figure 9 is a fragmentary elevation, in a view like that of Figure 7 but on a scale like that of Figure 8, of said control linkage, also schematically showing additional parts 80, connected therewith and some of which have been rotated through ninety degrees to bring them into the plane of the paper.
Figure 10 is a sectional detail view, taken along line 10—10 in Figure 9 and rotated through ninety degrees.

Reference is now made to Figures 8 to 10, which illustrate, among other things, the manner in which a tool clutch is controlled by the supervisory linkage unit 80 (Figure 9) mentioned above. In Figure 8 a perspective view has been taken from a position in back of the machine, so that the parts appearing in the remote or background portion of the figure are actually forward parts of the machine, according to normal orientation; and the normal nomenclature will be used in describing the figure. In Figure 9 the forward parts appear at left and the backward parts at right.

The aforementioned tool clutch engagement member 156, which is best shown in Figure 10 is pivoted to the driven clutch member, particularly to its shaft 214, by a pin 235 transverse of said shaft 214. Normally, the member 156 engages the driving clutch disc 105 by jaw or tooth means 236; for this purpose the member 156 is biased in a tilting direction, by a spring 237 which permanently engages the member 156 and the driven clutch disc 106. However (Figure 9), the force of the clutch spring 237 is overcome and the jaws of the clutch are disengaged when a beveled projection 238 of the clutch member 156 rotatingly strikes a matching, stationary end surface 239 on the aforementioned clutch dog 157. This dog, as shown in Figures 8 and 9, pivots on a journal 240 fixedly mounted in the tool head frame 182. The dog is normally pulled downwardly into such position as to be struck by the projection 238, for which purpose a spring 241 is anchored to the dog at 242 and to the frame at 243.

A dog lifter link 244, best shown in Figure 8, is pivoted to the dog 157 by a pin 245. It is adapted to be lifted by a horizontal lifter rod 246, which in turn is secured to a lever 247, fixedly pivoted at 248 and normally lifted by the aforementioned spring 158; the spring being connected with the frame 182 at 249. A fixed lower limit stop 250 prevents the link 244 and dog 157 from being lowered too far by the dog spring 241. On the other hand excessive lifting of the dog, the link and the lever by the spring 158, is prevented by a collar 251 secured to the top end of the aforementioned choke wire 155; the underside of the collar engaging a tab 252 on the lever 247. Thus the preferred connection between the clutch dog 157 and its lifting spring 158 is an indirect one; which arrangement is suggested in Figure 5 by showing the connection between the two members as a broken line. The two connecting members 244, 247 are capable of being latched in and out by other members, independently of one another, so as to allow snap action in engaging as well as disengaging the tool clutch, in spite of the inherently somewhat gradual motions of actuating cams. This snap action, in turn, provides both speed and accuracy in the operation of the entire machine.

For these purposes, the force applied to the tool clutch mechanism by the tool lock rod 63, through the choke wire 155, when the rod is moved downstream (toward the left in Figure 9), must exceed all spring forces employed in the clutch tripping linkage. On the other hand the applied force of the lifting spring 158 is adapted to overcome the applied force of the dog lowering spring 241—unless the lever 247 is held in lowered position, against upward motion. For allowing and utilizing such a position of said lever, during a certain phase of an operating cycle, there is provided a peculiarly shaped slot in the lifter link 244, which slot comprises a vertical, link unlatching slot portion 253 and at the lower end of said portion, a horizontal, forwardly extending, link latching slot portion 254. The lifter rod 246, held rigid with the lever 247 by a stirrup 255 (Figure 8), passes through this slot. A small spring 256, secured to stirrup 255, normally holds the link 244 backwardly, tending to latch the link onto the rod 246 and lever 247 when the latter is depressed. On the other hand a hook 257 is adapted, when pulled forward, to engage a horizontal rod 258 held on the link 244 by a stirrup 259, and thereby to move that link forward and to unlatch it, against the slight force of the spring 256. The hook is pivoted at 260 to a segment 261, which in turn is pivoted to the tool head frame 182 at a fixed point 262. The segment can be rotated, by upward pulling of a vertical rod 263, so as to pull the hook forward; said vertical rod being directly or indirectly connected to the upper ram lever 221 at a point 264, in such manner that the hook is pulled forwardly when the upper ram 109 descends, whereas the hook is shifted backwardly when the upper ram rises. A stepped stopping member 265 is rigidly mounted in the tool frame to prevent excessive backward motion of the rod 258 and link 244.

Figure 9 shows in full lines the position of the parts mentioned at the start of the transfer phase. Once during this phase the tool lock rod 63, shown at the bottom of the figure, is positively pulled a short distance downstream, that is to the left by its cam 120, as here shown in broken lines, and at the end of this phase it is allowed to return upstream to its full-line position, by the spring 63s (also see Figures 3, 5). As the rod moves downstream (Figure 9) it removes all tumbler pins 159 from their respective panel sensing fingers 162, 163, by the bell cranks 152, 153; see dash-dot line positions 152a, 153a, 159a. At the same time the rod moves the lower plug or collar 154 of the choke wire 155 downstream to position 154a. This latter action lowers the upper plug or collar 251 of this choke wire to position 251a and thereby depresses the lifter lever 247 to broken-line position 247a, overcoming the lifting force of the spring 158. This depression of the lever 247 can be performed gradually, during the transfer phase, without any attempt to time it exactly, the action being merely preparatory; see Figure 3, curve 63a in column B. At the end of this lever-depressing action, as a further preparatory measure, the link 244 latches onto the rod 246 of the lever 247, by the biasing force of the small spring 256; this is indicated in Figure 9 by dotted line 244a, partly outlining the new position of the link. The clutch linkage is now loaded or cocked for subsequent tripping, for the purpose of raising the dog and engaging the tool clutch or keeping it engaged.

This tripping and engaging of the clutch occurs when, at the end of the transfer phase—Figure 3, curve 63a, end of column B—a new panel P arrives in the tool head station and allows insertion of the tumbler pin 159 in the sensing fingers, as schematically shown in Figure 9. Here 163a shows the sensing finger immediately before the arrival of the new panel and 152a, 153a shows the then established position of the bell crank. At this moment the tool lock rod 63 and eyelet 150 as shown in full lines do not restrain the choke wire plug 154, but the bell crank does so, being stopped from inserting the tumbler pin 159 in holes 168, 167 because of the still existing misalignment of the stopping and sensing fingers 162, 163. Thus the clutch linkage lever 247 is still held down (247a), against the force of its lifting spring 158, by the reaction of the tumbler pin 159 against the finger 163, this reaction tending to hold the bell crank in the dash-dot position, turned clockwise from the normal one. If a new panel now arrives, and at the exact moment this happens, the sensing finger 163a moves to position 163; the holes 167, 168 in stop and sensing fingers 162, 163 are aligned; the reaction previously applied to the tumbler pin 159 is removed, the bell crank 152, 153 is allowed to rotate counterclockwise; the lifter spring 158 now snaps the lever 247, collar 251 and choke wire 155 upwardly; thereby it also lifts the link 244, which has been latched onto the lever, to a raised, backwardly tilted position 244b shown in dash-dot lines; and the link lifts the dog 157 into a new dash-dotted line position 157a; the force of the dog spring 241, as mentioned, being overcome by the lifter spring 158. Thus the tool clutch 50 is now free to engage; and such engagement ensues, as the clutch spring 237 now is free to tilt the jaw member 156 into driving position.

There follows now an insertion phase of the tool head 30, powered through clutch 50, wherein the ram 109 first moves downwardly and then returns upwardly, by means of the ram cam and spring members described above; also see Figure 3, column D.

The motion of the upper ram lever 221 provides power for a tool clutch disengaging snap action, during the insertion phase; right end of column D in Figure 3. Referring to Figure 9, the position of the clutch control links, at the start of the downstroke of the upper ram 109, is shown at 244b and 257. The hook 257 is still in a backward position, although it has been raised by rod 258. When the ram now approaches the lower limit of its stroke, the rod 263, as mentioned, raises the segment 261 and moves the hook connection 260 forward. As this action is being completed, the rod 258 and link 244 are also moved forwardly, to a fourth position 244c shown by a broken line. As the forward tilting of the link is completed, the lifter rod 246 re-enters the vertical slot portion 253; the link is unlatched by snap action; the force of the dog spring 241 is no longer overcome by the lifter spring 158; and the dog spring lowers the link, with the dog 157, to their original full-line positions.

In a later phase of the cycle the clutch 50 brings the striking surface 238 of the engagement member 156 into the vicinity of the dog point 239 again. If the dog is still lowered, the elements 238, 239 then come into contact and the clutch disengages. However, if the cycle has proceeded normally and a new panel has been transferred to the tool station, the dog is raised just a moment before its impact with the striking surface 238 and the clutch stays engaged and able to supply power for a new insertion.

No new transfer phase is desirable unless and before all tool rams have returned to their starting positions. For instance, should a component or a part thereof, accidentally or intentionally, have found its way into the bottom area of a lower tool ram 110 and should it prevent that ram at least momentarily from reaching its starting position, such a condition should be signalled to the control head 61, as part of an insertion check, Figure 3, column A. In such a condition, the machine should be able to temporarily lock the transfer mechanism and thereby—through the clutch linkage just described—temporarily also to lock at least all tool heads other than that affected, while making it possible for that tool head to be freed of its obstruction, automatically or otherwise.

For such purposes, the machine comprises, as still shown in Figure 8, a stop plate 266, secured to the aforesaid insertion detector lever 170 adjacent the segment 261 in such manner that the detector lever 170 can be lowered, and the insertion check completed, if and only if the upper ram 109 has returned to the top and has tilted the segment 261 to its normal starting position by the rod 263. Likewise there is provided a rod 267, adapted to be raised when the lower ram 110 reaches its bottom position, at which time this rod 267 by mechanism 268 removes a second segment 269 from interference with the stop plate 266, the first and second segments 261, 269 being pivoted on the same shaft 262.

If the lever 170 of any tool head cannot be lowered, because of interference at 266, the respective cable 171 holds the rod 62 and its actuating lever upstream. When the cam of said lever, thereupon, would allow a movement removing the program clutch dog from interference with said clutch, at the critical moment of the clutch rotation when interference is possible, the upstream retention of the rod 62 enforces continued interference by the clutch dog, and the program clutch is opened. The principal effect is that no further drum cam engagement start can be performed, by the drum follower start cam, until the interference at point 266 of any tool head is removed and the program clutch returned to engaged condition.

Thus the segment mechanism 261, 269, etc. cooperates with the insertion checking, transfer locking linkage 90 as well as with the transfer checking, insertion locking linkage 80. (In this connection it may be noted also that a fixed pivot 270 is provided for the said insertion checking lever 170 and further, that choke plug and tab means 271, 272 cooperate with the insertion checking cable 171 in the same manner as the members 251, 252 cooperate with the transfer checking cable 155. A fixed anchor 273 is provided for the aforementioned lifter spring 169 of the insertion checking lever 170.)

Often it may be desirable to provide for automatic checking and correction of further types of tool or insertion trouble, the possible causes of such trouble being approximately as manifold as the types of components to be inserted in the panels. As indicated above, a most frequent type of trouble consists in the mere development of the so-called bubble in the component supply, reaching the panels through the component chute; such trouble can be detected readily either by mechanical feelers or other devices, such as electric eyes 213 (Figure 6). Still other types of component or insertion trouble must be expected, in a largely permanent or semi-permanent machine, to be used with newly developed as well as conventional components. For this reason it is deemed most desirable to effect only actuating, transfer checking and similar operations mechanically and to perform all component trouble detecting operations, in principle, with the aid of electric or electronic sounding means, with or without mechanical or other auxiliaries; the latter arrangements being most versatile and most adaptable to unforeseen, future trouble sources. Therefore, it may be assumed that predetermined types of insertion trouble, other than those detectable by the rods 263, 267, are detected by additional electric eyes and/or other special detection tooling, not shown and forming no specific part hereof. Such tooling, by appropriate circuits, not shown, can produce suitable energizing impulses, for instance, energize a normally de-energized solenoid 274 which solenoid may be adapted by a rod 275 to tilt still another stop segment 276 on the shaft 262, for the aforementioned control of the insertion check lever 170. In fact, more than one mechanism of the last mentioned type and more than one segment 276 may be provided.

In order to allow repeated insertion attempts, in case of a component supply bubble, such a trouble detector segment 276 desirably has a tab 277 rigidly secured thereto and adapted to raise the hook 257 whenever the segment is raised to interfere with the stop plate 266. Thus, in such emergencies, the tool head in question will continue cycling, under the actuation of the clutch 50; the disengagement of the clutch, by the hook 257, being disabled by said solenoid 274, segment 276 and tab 277. Of course, it is desirable to limit such extra cycling to a predetermined period of time or number of cycles, by suitable timing or cycle-counting equipment, not shown, which may in due course de-energize the solenoid 274.

It may also be noted at this point that still further parts are illustrated in Figure 8, connected with the clutch dog lifting link 244. These further parts will best be described hereinafter.

The drive and control system

Figure 11:
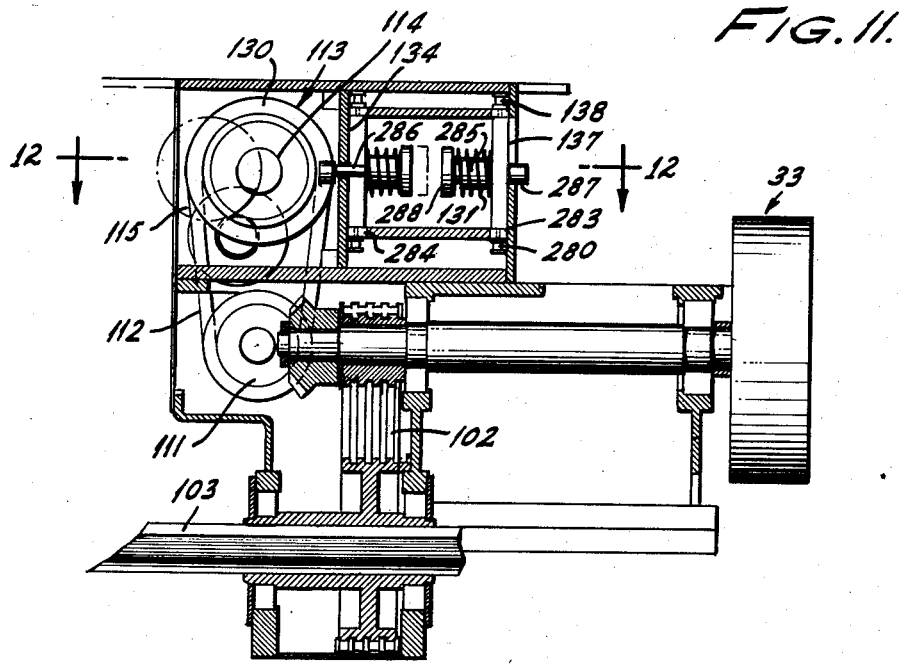
Figure 11 is a section through the drive head of the machine, the section being taken along line 11—11 in Figure 2.
Figure 12:
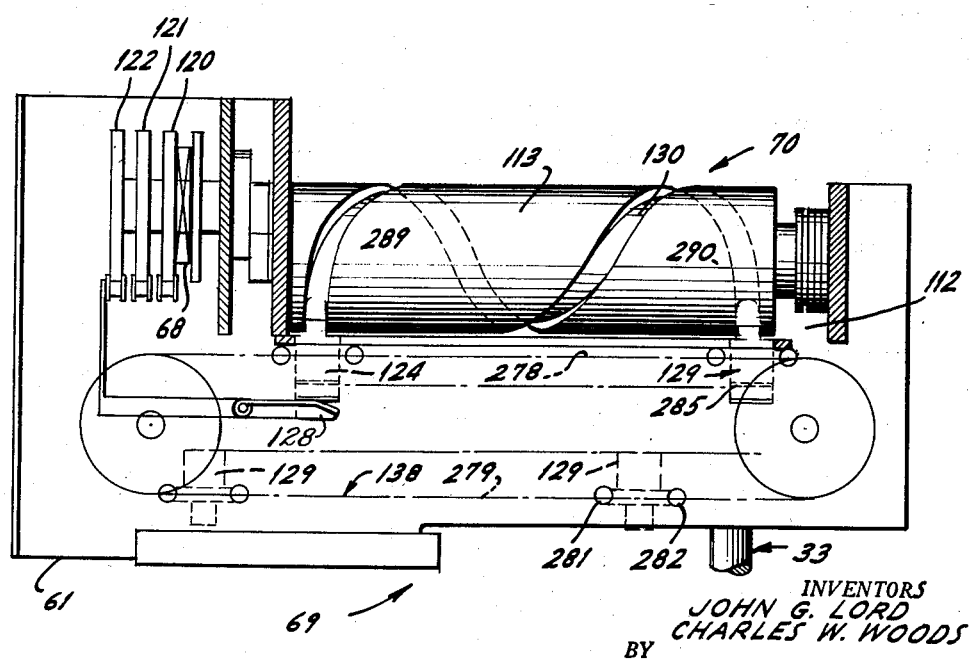
Figure 12 is another section through said drive head, the section being taken along line 12—12 in Figure 11 and the view being rotated through ninety degrees.

Details of the drive and control heads 33, 61 of the transfer and supervision system are diagrammatically shown in Figures 11 and 12.

Four drum cam followers 129 are shown in Figure 12; two of them on what may be called the active run 278 of the aforementioned chain 138 and two on the inactive or return run 279. In order to guide these drum followers accurately, there is also provided, as shown in Figure 11, a lower chain 280, similar to the chain already described and located below the same. Top and bottom portions of the follower blocks 137 are guided by these upper and lower chains respectively. In order to eliminate undesirable friction, a pair of horizontally rotatable rollers 281, 282 are provided at the top of each follower block and a similar pair 283, 284 at the bottom thereof, the pairs of upper rollers being most clearly shown in Figure 12. The latter figure also shows how the four drum cam followers are coordinated with the drum cam 113: the follower at the right hand end of the active run 278 has just been released by the drum cam, in the manner described above; the follower at the left hand end of said run stands ready to be engaged if and when the transfer starting cam link 128 (Figure 12) moves its follower shaft through the aperture 132 in the slotted plate 134 against the resistance of spring 131 (Figure 11); and the pair of followers on the inactive return run 279 are adapted to take the positions of the first-mentioned followers. Referring to both Figures 11 and 12, it will be seen that each follower block 137 is provided with a bearing member 285, wherein a follower shaft 286 is slidably mounted; said shaft carrying a drum cam engagement roller 287 at one end and a plate 288 at the other; the aforementioned transfer clutch spring 131 being inserted between the follower block and the plate, for the purpose of disengaging the follower roller in the manner already mentioned.

The cam slot 130 in the drum cam 113 has an extension of two times 360° around said cam, which extension corresponds to a longitudinal cam follower travel covering a distance equal that between tool head stations; according to the exemplary figures given above, eighteen inches. Instead of shaping the slot 130 with uniform pitch, it is preferred to make the pitch of the slot very small adjacent the beginning and ending portions 289, 290 of the slot and to increase it gradually to a uniform maximum, between said portions. This arrangement has two distinct advantages. For one thing it enables the drum cam to serve not only as the principal member of the transfer clutch 69 but also as a transfer speed control mechanism 70, which accelerates and decelerates each panel in a gradual manner while transferring all panels with desirable rapidity. In addition, the small or zero pitch of the slot 130 at the delivery end thereof, on the right hand in Figure 12, serves to avoid undesirable reverse motion of the transfer device 31; and for this latter reason it is preferred that the shape of the delivery aperture 133 in the slotted plate 134 should closely match the size and shape of the delivery end of the drum slot, and should allow disengagement of the drum follower roller 287 only in forward and transverse, not in backward directions. Reverse motion of the entire elongated panel transfer mechanism would otherwise occur at the end of each transfer stroke, because of resiliency which may either be inherent in the panel transferring pushers 30p or may intentionally be provided, as will be described, in order to aid in simplifying the panel stopping and indexing operations.

Further details of the program clutch 68 are disclosed in Figures 13, 14. The engagement member 174 of this clutch resembles the corresponding member 156 of the tool clutch 50, described above, in that it is tiltably mounted on the shaft 291 of a driven clutch disc 119, by a pin 292; also in that it is biased by a spring 293 to engage a driving clutch disc 118, by a jaw or tooth 294 as shown; and in that it can be disengaged by interposing a beveled striking surface 295 of a dog 126 on the peripheral path of a similarly beveled surface 296, formed on a projection 297 of the engagement member. However, the present clutch is disengaged by raising, not by lowering, the dog; and the dog is normally biased against, not toward disengaging interference. This biasing is caused by the spring 64s, adjustably connected to the dog by means of the cam follower arm 117 subject to control by a stop member 298; said spring providing also the force for biasing the transfer lock rod 64 in a downstream direction.

A further important feature of the program clutch 68 is provided by a stop plate 299, installed adjacent the clutch elements mentioned. This plate is mounted in the plane in which a suitable part of the tiltable clutch engagement member 174 lies when the clutch member has been tilted for disengagement, see Figure 14; the radial distance of said part, from shaft 291, being suitably greater than the radius of clutch plate 118 (a feature which has been schematically disregarded in Figure 13 but which is required and used in order that clutch tooth 294 may clear plate 299 during the normal rotation of said tooth; also note that in Figure 14, wherein a horizontal section has been taken through said part 297, the clutch discs 118, 119 are not seen). The stop plate has at least one surface 300 adapted substantially to abut upon a similar surface 301 of the projection 297, upon said disengagement, but adapted not to interfere with any part of the clutch when the clutch is engaged; the orientation of the surfaces 300 and 301 being such that upon contact between them, further rotation of the engagement member 174 and of the driven clutch disc 119, in their normal sense of rotation, is positively stopped at an exactly defined point of such rotation. This is a feature of importance for the accurate working of the present program timing clutch, since a variety of forces tend to cause undesirable drifting rotation of the driven clutch disc and disengagement member, after theoretical disengagement thereof. For instance, such drifting may be caused by friction of concentric driving and driven shafts, illustrated in Figure 10; by inertia of driven members; and by pressure of a cam follower element such as that shown in Figure 13 at 123, against a cam such as 120, that cam being rigidly connected with the driven clutch disc 119.

The latter force may cause drift in either forward or reverse directions, depending upon the shape and orientation of cam projections or lobes. For this reason it is preferred that the stop plate 299 also provide a second stop surface 302 (Figure 14), opposite the aforementioned stop surface 300, and that the engagement members 291 have a matching surface 303, facing the surface 302 upon disengagement of the clutch. In other words, the projection 297, bounded by the surfaces 301 and 303, should just fit in between the substantially stationary surfaces 300, 302, during the disengaging motion and positioning of the clutch. It is then possible to perform the insertion and withdrawal of the dog 126 either gradually or by snap action, as may be preferred or required for each clutch cycle; the driven clutch members stop at an exactly defined point, in either case, without forward or backward drift.

The stop plate 299 desirably is mounted slidably between guides 304 for purposes of adjustment. It is normally stopped from sliding, either forward or backward, by shear pins 305, 306 or the like.

A positive stop positioning and maintaining mechanism, similar to the parts 299 to 306, may be desirable also for a tool clutch, such as that shown at 50, although frictional and similar drifting of the driven clutch members is less probable and less critical in the tool head mechanism than it is in the program mechanism.

Reference should finally be made to Figures 15 and 16, as to details of the control elements and pushers whereby the program cams and the drum cam transmit controlling and driving impulses to the panels and tool head clutches.

The transfer structure 31 is shown as comprising a pair of guide tracks 307, 308, horizontally aligned with one another and occupying front and back positions respectively. One of the two tracks, 308, advantageously engages adjacent edges of the panels P by an edge of a transversely slidable, forwardly spring-loaded track section 309, so that all panels are normally held in longitudinal slidable engagement with the tracks but that each panel can be shifted against the resilient pressure applied by section 309 and, upon such shifting, manually removed from the tracks at any time, for inspection and other purposes.

The front track 307 is combined with a chain guide structure 310 for maintaining straight-lined orientation of the aforementioned transfer chain 143 and similar orientation of an additional, parallel, lower chain 311, driven in unison with the chain 143 and carrying a holdback member 312 in front of each panel P. The chain guide structure 310 may also support the supervisory rods 63, 64 and the stop rod 62, by support members 313.

One of the panel guide tracks, 307, as well as the chain and rod guide 310, may be secured to fixed holder members 314, suitably mounted on a general track support structure 315 which in turn is carried by and secured to the tool head base 179 (Figures 1, 6, 15). The other guide track 308, as best shown in Figure 15, is preferably secured to movable track holder posts 316; and such posts may be slidable transversely of the panel transfer structure 31, while being held against other motion, by means of elongated, transverse post guide members 317. The position of each slidable track holder post is controlled by engagement between an interiorly threaded socket 318, forming part of the post, and a threaded spindle or lead-screw 319, extending along the post guide 317; one end of each spindle 319 having a sprocket 320 secured thereto and engaged by a chain 321, so that all of said spindles can be turned and can only be turned together. Thus any one of these spindles can be turned, by any suitable crank 322, and the system of spindles then moves the entire rear track unit on its support guides, transversely of the machine; thereby providing a simple and efficient adjustment for panels of different widths, see positions 308 and 308a in Figure 15.

Corresponding adjustment for panels of different length is provided by suitable spacing of panel pusher units 30p from hold-back units 312, on the interlocked, superposed transfer chains 143, 311; struts and links 323 being used to removably attach these members to different chain links. Small differences of panel dimensions, intermediate the fixed dimensions of the chain links, are taken up by resilient mounting elements 324 for the pushers; such resilient mounting being desirable also in order to firmly hold each panel between its pusher and hold-back members, except when the panel is stopped by the stopping and indexing finger assembly 60.

The panel stopping and sensing finger mechanism has been described sufficiently, in connection with Figures 5 and 9. As further shown in Figure 16, this mechanism may advantageously cooperate with predetermined notches or similar registering features in the panels P. For instance, the illustrated panel is shown as being rectangular, with a triangular stop-register notch N for engagement with the rigid stop finger 162; this notch being formed in the leading end surface, adjacent the rear guide 308a. The panel also has a semicircular pusher engagement notch M in the trailing end surface, adjacent said guide. The positioning of these notches on the panel relative to circuits C serves to make sure that no component insertion is inadvertently attempted on panels lying in reversed, improperly registered positions: any reversed panel is stopped by the rigid finger 162 in a position where the rocking finger 163 fails to be sufficiently deflected by the leading panel edge to clear the path for the tool clutch engagement tripping tumbler pin 159.

The supervisory instruments, comprising the rods 62 to 64 and their associated eyelets, choke wire plugs, cranks, tumbler pins, etc., are desirably covered by a guard 325, extending along the entire length of the machine, in order to protect this sensitive mechanism from accidental interference. On the other hand the stream of panels P, between the guide tracks 307, 308, is desirably open and visible, in order that the work done by the machine may be inspected readily.

The operation of the control system and the entire machine can now be described in particular. In describing this operation, we will recapitulate, but briefly, the details which were explained above and will emphasize mainly the sequence and interrelation of the various steps.

Initially (Figures 1, 6), the panel supply 32 and the component supplies 206 of a series of tool heads are manually or automatically loaded with suitable numbers of panels and components, respectively; the different tool heads are manually adjusted, relative to their station areas, by turning their respective adjustment handles 188, 191, and 192 until their respective indicators 193, 194, 195 show the predetermined positions; and control members 326 for the variable speed drive 101 and related elements are suitably adjusted; the adjustment being shown by indicators 327. Then the prime mover 100 is started, by throwing a switch 328, so that it starts rotating the tool drive shaft 103 and driving tool clutch discs 105. Next, the transfer of panels is started by removing stop member 298 from interfering with spring 64s (Figure 13). For this purpose an upper portion of said member is suitably caused to slide back from an extended (dotted line) position, wherein it has, up to this moment, held rod 64 (by a pin, the original position of which is also shown in dotted lines) against the tension of spring 64s.

A stream of panels then begins to move intermittently, in a downstream direction, along guide tracks 307, 308 in intermittent transfer strokes properly timed and controlled by the transfer clutch and control 61, 69, 70, with a pause period at each tool head station between every two transfer strokes, for insertion strokes by the tool heads, and with intervening and interlocking, supervisory actions.

The timing of these actions and strokes may best be analyzed by reference to Figure 3, bearing in mind the control elements illustrated mainly in Figure 5. Referring first to curve 64a in Figure 3: the insertion check operation, column A, begins as the transfer lock cam follower 117 reaches a low lobe of its cam 116, indicated as a dip in the curve 64a. The follower is thereby allowed to be moved a short distance downstream by the spring 64s (Figures 5 and 13), if—and only if—it is not restrained from such movement (Figure 8) by any of the insertion check segments 261, 269, 276, stop plates 266, levers 170, choke collars 271 and cables 171. Thus the transfer lock cam 116 now allows, and the spring 64s now initiates, a downstream, insertion checking movement of the transfer lock rod. The transfer lock cam, as such, offers no interference with the program clutch 68, then or at any other time; but any then existing restraint of a plate 266, at any of the segment systems 261, 269, 276, would now produce a signal through a cable 171, causing such interference; it would keep the program clutch dog 126 (Figures 13, 14) in the path of the projecting member 297, which member reaches the dog position in this phase of the cycle. Thus the program clutch would be disengaged at this point, and it would allow emergency cycling of the signalling head as described (Figures 8, 9), until the signalling segment is returned to normal position.

Otherwise, the normal cycle continues, with a rise and fall of the curve 69a, indicating a rising and then falling lobe on the drum cam follower engagement cam 122. Said raising lobe causes the start of a transfer stroke, as explained (Figures 5, 11, 12).

The cycle continues, next, with a drop of curve 62a, indicating transition from a high lobe to a low lobe on the transfer stop cam 121 (Figure 5). At this point said cam allows the upstream biasing of the stop rod 62 to move that rod and the connected pins 178 and cranks 176 upstream, tilting all stop finger assemblies 51 to 60 downstream (Figures 4, 5, 15, 16) away from interference with the panel transfer.

The panel transfer is now effected by the drum cam 113, one of its followers and the connected chains and pushers 30p, with suitable acceleration and deceleration control by the drum cam (Figure 3, column B; Figure 12).

During this stroke, preparation is also made for a subsequent transfer checking action and for loading action applied to the head clutch controls, as indicated by a rise in curve 63a. In addition preparation may then be made for a subsequent insertion check, as indicated by the rise in the aforementioned curve 64a.

At the end of the transfer phase, the aforementioned transfer stop cam and rod 62, Figure 3, curve 62a, reinsert the panel indexing and stopping finger assemblies 51 to 60 in their operative positions.

Shortly thereafter, column C, curve 63a, the tool lock cam allows resilient shifting of the tool lock rod 63 upstream, pursuant to the cam actuated, preparatory downstream shifting of said rod, which has just been mentioned. The downstream shifting of this rod resulted in the loading of the tool clutch engaging linkage, and the reverse shift trips those linkages in all stations which have received new panels (Figures 8, 9).

A power stroke or insertion stroke of each of these tools is the next result (Figure 3, column D). In performing these strokes on identical panels, the different insertion tools will ordinarily operate with generally simultaneous movements, although such movements could be staggered or modified in other respects. Each tool generally operates on a separate panel P, identical with the other panels. It is a matter of indifference to the present machine what area of each panel is operated upon by each tool head; in other words the ultimate geometrical arrangement of components on each panel may be either regular or irregular and if it is regular, consecutive tool heads may operate on different component locations in any desired segment, for instance, adjacent heads 21, 22 may work either on widely separated component areas or on adjacent component areas.

During each insertion stroke each tool clutch disengagement preparation linkage is loaded and at the end of the stroke it is tripped, as described (Figures 8, 9).

As a result of the panel-sensing control the machine is self-loading and self-clearing. Only the first tool head 21 normally operates during the first insertion cycle after a new start; the first two 21, 22, normally operate during the second cycle; and so on, until a stream of panels has been established from the upstream end to the downstream end of the machine, whereafter all tool heads 21 to 30 normally operate during all insertion phases of successive cycles. At the end of an insertion program or fabrication period the machine automatically clears itself, the different heads stopping operation in the sequence 21, 22 . . . 29, 30, as the last panel is transferred through the machine. The transfer and control head continues to work, even without panels, until a start and stop switch 328 de-energizes it.

Assuming that normal delivery of panels is interrupted for a few seconds, either at the supply 32 or by removing a panel from the tracks by means of the resilient track members 309 (Figures 15, 16) there is thus formed a bubble in the panel stream. This bubble moves in a downstream direction, at the same rhythm at which the preceding and following panels move. Whenever such a bubble arrives in a station area, the corresponding tool head does not attempt an insertion stroke, whereas all other tool heads, receiving new panels, operate without such interruption; this operation being provided by the apparatus described particularly in connection with Figures 5, 11 and 12.

It may further be assumed, as initially explained, that a bubble may sometimes occur in one of the streams of components, flowing from one of the component supplies 206 to the corresponding tool T. If such is the case, no insertion is made by said tool upon a first insertion attempt thereafter, as explained in the description of the tool heads. As a result, a series of automatic insertion attempts are made by said tool, whereas the other tools and the transfer apparatus are at rest during the fractional second or seconds required for this purpose; all this under the control of the mechanism described particularly in connection with Figures 5, 8 and 9. If the component supply trouble was temporary and if a component is soon found by the then operating tool head, such component then passes the sensing mechanism which had previously actuated the solenoid 274 and caused continued cycling; as soon as the component now passes to the tool T, said solenoid 274 is de-energized; a normal insertion ensues; a normal insertion check result is mechanically signalled to and through the transfer lock rod 64; and normal operation of the entire machine is automatically resumed.

Of course it is also possible that, in some instances, no component is found in such automatic attempts, or that other, less foreseeable trouble occurs in the component supply or the machinery connected therewith. In such events, the head in question remains locked and at rest and a manual repair thereof becomes necessary and possible, whereas the remainder of the machine can continue working.

Furthermore, it may be desirable, even in the absence of such an emergency, to provide for various forms of manually performed or manually initiated interferences with the normal interlock of any or all of the tool heads. In this connection, reference must be made once more to Figure 8.

For instance, one manual cycle of a single tool head may be desirable in a set-up stage, when the performance of a new component shall be tested. For this purpose the lifter link 244 has an extension 329 with a rectangular aperture 330 therein, adapted to be engaged by a lever 331 pivoted at 332 and forming a bell crank with a handle 333. Ordinarily said handle is kept in a low position 334 as shown, wherein the lever 331 is inoperative and allows the normal cycling and cycle re-orienting operations, as described. However, the handle 333 is also adapted to be turned to a position 335 such as to raise the lever 331 and thereby the link extension 329 and link 244. Thereupon the aforementioned small spring 256 can pull the link 244 and its rod 246 backwards, even if the rod 246 was previously caught in the vertical slot 253. No tripping impulse from the tool lock rod 63 is required, and the handle 333 can be allowed to fall back to its original position; yet there follows one complete insertion cycle of the tool head in question, the tool clutch dog 157 being raised by the link 244 and the clutch being engaged as a result, until the normal disengagement of said clutch is effected by the segment 261 and hook 257.

Sometimes a new type insertion operation must be tested more than once. In such cases the handle 333 can be turned to another position 336 where it similarly raises the link 244 but is prevented by a detent, not shown, from falling down when released. As a result, movement of the hook 257 only causes the link 244 to oscillate forward and back in raised positions, but not to fall back and to lower the clutch dog. The head therefore continues to cycle; it stops only when the handle is positively turned away from position 336.

Should it be provided in an insertion program, or otherwise decided, that a predetermined head shall not cycle at all, this can be achieved also, by turning the handle 333 of this head into a detent position 337 such as to push or hold the lever 244 down; if necessary, this can be done against opposition offered by the lifter spring 158. This particular tool head is then in non-cycling position. Such a position can also be held and enforced by automatically inserting a lock member 338 in a suitable aperture 339 in the link 244, while the link is lowered; for instance by pushing such a lock member forwardly by a solenoid 340, actuated by a suitable circuit, not shown.

Thus the tool clutch tripping and mechanical interlocking mechanism, as described, provides for normal and emergency cycling of all tool heads, in the pause periods of the transfer mechanism, subject to tool and transfer checking, whereas the manual adjustment handle 333 and/or solenoid 340 allow further modifications, such as manual performance of a single tool cycle, manual performance of continued tool cycles by one tool, or manual or automatic inactivation of one tool for one or several cycles.

While only one apparatus according to the invention has been described, it should be understood that the details thereof are not to be construed as limitative of the invention, except insofar as set forth in the following claims.

We claim:

1. In apparatus for automatic fabrication of electrical circuit panels, an elongated base; a guide structure carried by said base and defining a similarly elongated path for sequential transfer of panel boards; a plurality of fabricating heads spaced along and adjustably mounted on said base, each head comprising component feed and ram means for automatic insertion of at least one circuit component in each of said panel boards transferred along said path, each ram means being mounted for reciprocation thereof in a direction transverse of said path and transverse of the panel boards on said path; traveling means for transferring the panel boards along said path; a prime mover; ram drive linkage driven by said prime mover for driving the ram means of each head; transfer drive linkage driven by said prime mover to intermittently, unidirectionally move said traveling means along said path and thereby to sequentially transfer the panel boards to said heads with a pause period of each panel board at each of said heads, said ram drive and transfer drive linkages being arranged to drive the ram means during the pause periods of the transfer means; and control means associated with each of said means and adapted to prevent said driving of the respective means, said control means comprising feeler linkage extending along said path and driven by the prime mover.

2. Apparatus as described in claim 1, wherein the feeler linkage comprises a feeler associated with each head, each feeler being adapted to determine, at the start of each pause period, whether the traveling means has transferred a new panel board to the respective head; and a head control device associated with each head, and controlled by the respective feeler to prevent the driving of the respective head in each pause period at the start of which no new panel board has been transferred to the head.

3. Apparatus as described in claim 1, wherein the feeler linkage comprises a detector device associated with each head, adapted to test, during each pause period of the traveling means, the respective component feed and ram means with respect to the condition of such means as to insertion of circuit components; and means adapted to be controlled by any of said detector devices upon such a condition and adapted thereupon to allow continued operation of the respective head but to prevent driving of the traveling means, new pause periods thereof and new operations of the several heads during the new pause periods, until the continued operation of the respective head has removed said condition.

4. In apparatus for automatic fabrication of complex articles, a series of fabricating heads each comprising manipulator means adapted to perform a fabricating operation upon an article transferred to and registered relative to the head; rigid, elongated base framing for all of said fabricating heads; a rigid, transverse sub-base for each fabricating head; means for adjusting the position of each sub-base along the elongated base framing and for adjusting the position of each head, along its transverse sub-base; transfer guide means for said articles, said guide means being secured to said base framing and extending along the series of heads; a rotatable power shaft extending through the base framing for actuation of the entire series of heads; power transmission means, connecting said shaft with the manipulator of each head in uniform rotational coordination, in all of said positions of each sub-base and head; elongated control means extending and movable along the series of heads; a system of flexible connectors, at least one mechanically connected with each head and each mechanically connected with the elongated control means; and means adapted to perform movements of the elongated control means in mechanically timed coordination with the rotation of said shaft.

5. Apparatus as described in claim 4, wherein each manipulator means comprises upper and lower, relatively reciprocable ram members, respectively overlying and underlying the articles transferred to the head; upper and lower ram guide means for the respective ram member; and means adapted to simultaneously and uniformly rotate such upper and lower ram guide means of each head.

6. Apparatus as described in claim 5, wherein the transfer guide means comprises a pair of rigid channel members adapted to directly engage edges of said articles.

7. Apparatus as described in claim 6, wherein at least one of said rigid channel members is adjustably mounted, so as to allow adjustment of its distance from the other channel member and thereby to allow direct engagement and transfer of articles of different size.

8. Apparatus as described in claim 6, wherein at least one of said rigid channel members comprises a member resiliently mounted to allow removal of any article from any point of the guide means.

9. Apparatus for rapidly inserting circuit components in large numbers of circuit panels, said apparatus comprising an elongated line-up of tool heads, each head being adapted to supply a stream of components and to insert at least one component in each panel successively transferred thereto; elongated panel transfer means extending along said line-up; transfer drive means adapted to feed an intermittent stream of panels along said line-up by effecting transfer strokes of the transfer means and also effecting intermediate pause periods of the transfer means and panels at the heads; drive means for the heads, adapted to operate during said pause periods; supervision means, adapted to interfere with the operation of any one of said drive means on interruption of the stream of panels and of any of the streams of components; drive means for the supervision means; and rigid linkage means interconnecting said several drive means and adapted to apply coordinated driving forces of said several drive means thereto and to the parts connected therewith.

10. Apparatus as described in claim 9, wherein said supervision means comprise resilient linkage, in each tool head, mechanically interconnected with said rigid linkage.

11. Apparatus as described in claim 9, wherein the supervision means is adapted to operate in rapid, cyclic correlation with the transfer means and the series of tool heads, so that the apparatus performs a normal program of repetitive cycles, each cycle comprising, in succession, a tool stroke checking phase, a transfer phase, a transfer checking phase and a series of tool strokes.

12. Apparatus as described in claim 11, wherein the supervision means is adapted to time each of said phases and to prevent interruption of a transfer or tool stroke phase before the normal end of such phase.

13. Apparatus as described in claim 9, wherein said elongated panel transfer means comprises, and is adapted to engage each panel by, a member rigidly connected to the transfer means at one end of the panel and by a member resiliently connected to the transfer means at the other end of the panel.

14. Apparatus for inserting a plurality of different components in each of a series of uniform panels successively transferred along a transfer path, said apparatus comprising a series of component insertion heads, disposed in line along said transfer path; an insertion tool in each head; driving and driven shafts for operating the tool in each head; transfer means for transferring the panels along said path and stopping them exactly opposite said tools; a drive shaft for the transfer means; clutch means interposed between each of said driving and driven shafts, each clutch means comprising a pair of driven and constantly rotatable driving clutch members, one such pair being associated with each of said tool heads and constituting a head clutch and one such pair being associated with said transfer means and constituting a transfer clutch; head clutch control means adapted to keep the driving and driven clutch members of each of said tool heads engaged throughout each complete insertion operation of the corresponding tool head, and to allow but not normally to effect disengagement of said members at a single terminal point of such operation; and transfer clutch control means adapted to keep the driving and driven clutch members of the transfer means engaged during a single transfer operation, to disengage them thereupon and to re-engage them only on completion of each insertion operation of all heads; linkage controlled by the insertion heads and transfer means for performing tests of such completion; and program timing means for timing the applications of such tests.

15. Apparatus as described in claim 14, wherein the program timing means comprises cam means driven by the driven member of the transfer clutch.

16. Apparatus as described in claim 15, wherein an additional or program clutch is interposed between the last mentioned driven member and at least part of the cam means; said cam means comprising program timing linkage extending along the series of heads and connected with the head clutch control means, also comprising linkage connected with the transfer clutch control means, and further comprising program clutch control linkage adapted normally to keep the program clutch engaged and to allow opening thereof only by said linkage and only in one position of the cam and transfer means.

17. Apparatus as described in claim 14, wherein the program timing means comprises a pair of elongated members extending along the series of heads; the head clutch control means being connected with the first of said members, the transfer clutch control means being connected with the second of said members, and said second member being adapted to cause engagement of the transfer clutch only on completion of each pair of transfer and insertion operations.

18. Apparatus as described in claim 17, wherein each of said elongated members is adapted to reciprocate intermittently.

19. Apparatus as described in claim 17, comprising snap-action apparatus for engaging and disengaging each head clutch, the first of said elongated members being adapted first to cock said snap-action apparatus of each head clutch and then to trip it for engaging the clutch if the head clutch control means allow it; and other means being adapted first to cock and then to trip said snap-action apparatus of each head clutch for disengaging it.

20. Apparatus for mass producing electrical circuit modules by inserting circuit components in component carriers, said apparatus comprising a series of not less than five and not more than twenty-five insertion station means, disposed in line along a transfer path for the component carriers, each station means comprising an insertion tool and being normally adapted to feed a stream of the components to the respective tool by rapid, intermittent feed strokes; transfer means powered and normally adapted to move a stream of the carriers along said path, to the successive station means by rapid, intermittent, transfer strokes; a tool manipulator head adjustably mounted in each station means, adapted and powered to move the respective insertion tool in rapid, intermittent, reciprocatory tool strokes transversely of the transfer path for insertion of a component in each carrier; control linkage means extending along the transfer path and adapted to render the transfer means and the tool manipulator heads operative and inoperative in a normal alternation; and supervisory means associated with said linkage means and adapted to modify said normal alternation during any interruption of either of said streams.

21. Apparatus as described in claim 20, wherein said series comprises ten insertion station means; the apparatus comprising a single prime mover for driving all tool manipulator heads.

22. Apparatus for the automatic fabrication of complex articles, comprising a series of fabricating machines each adapted to perform a fabricating operation upon such an article, transferred to and registered relative to the machine; a rotatable drive shaft extending through the entire series of machines; power means for driving the shaft; power transmission means for each machine including a normally engaged clutch adapted to connect the drive shaft with the machine for driving the latter; elongated, movable control means extending along the series of machines and controlling said clutch of each machine; a system of connectors, one associated with each machine, and each connected with the elongated control means and with the clutch of the respective machine in such manner that engagement of the clutch is controlled by movements of the control means; control drive means synchronized with said drive shaft for cyclically effecting said movements; and means controlled by each machine for disengaging the respective clutch upon a predetermined operation of the machine.

23. Apparatus as described in claim 22, comprising release means adapted to effect snap-action movement of the clutch of each machine, upon impulses comprising said movements of the aforementioned control means.

24. Apparatus as described in claim 23 wherein said release means comprises a first release actuator adapted to cause engagement of the clutch when an article has been transferred and registered relative to the machine, and a second release actuator adapted to cause disengagement of the clutch when the machine has performed a fabricating operation and no new article has been transferred to it.

25. Apparatus for automatic fabrication of modules, comprising guide means defining a transfer path for sequential transfer or module elements; fabricating means for operating on such elements, said fabricating means being mounted opposite said path; transfer means for driving said module elements along said path; transfer drive means adapted to effect intermittent unidirectional motion of said transfer means, whereby to transfer said module elements along said path with a pause period of each such element at the fabricating means; a stop; actuator means adapted during said transfer to insert said stop in said transfer path at a point fixed with respect to the path, whereby to stop each module element, driven along said path, opposite the fabricating means, and thereafter to remove the stop from said transfer path in order to allow further transfer of the module; a feeler movably associated with said stop to be deflected upon the insertion of the stop and arrival of a new module thereat; and linkage means adapted to be controlled by such feeler deflector and in response thereto to control the operation of the fabricating means.

26. Apparatus as described in claim 25 wherein the stop comprises a finger element and the feeler is yieldably secured to said finger element.

27. Apparatus as described in claim 25 wherein the linkage means comprises a tumbler pin adapted to slide through openings of the stop and feeler if and only if the feeler is deflected; and means adapted to cause such sliding.

28. Apparatus as described in claim 25 wherein the stop has a surface, facing the module elements transferred thereto, which surface is adapted to register with an edge of each module element successively transferred to the stop.

29. Apparatus as described in claim 28 wherein said surface of the stop is bevelled and has a form and position matching the form and position of a notch, provided in one edge of each of said module elements.

References Cited in the file of this patent

UNITED STATES PATENTS

| | | |
|---|---|---|
| 1,314,503 | Christensen | Sept. 2, 1919 |
| 1,318,617 | Craig | June 14, 1921 |
| 1,817,462 | Phelps | Aug. 4, 1931 |
| 2,205,311 | Sabatello | June 18, 1940 |
| 2,355,522 | Garbe | Aug. 8, 1944 |
| 2,445,819 | Bell | July 27, 1948 |
| 2,477,343 | Brown | July 26, 1949 |
| 2,568,249 | Nilson | Sept. 18, 1951 |
| 2,582,606 | Riddle | Jan. 15, 1952 |
| 2,712,866 | Llata | July 12, 1955 |
| 2,772,416 | Dorosz | Dec. 4, 1956 |